US008315662B2

(12) United States Patent
Anigstein et al.

(10) Patent No.: US 8,315,662 B2
(45) Date of Patent: Nov. 20, 2012

(54) USER SPECIFIC DOWNLINK POWER CONTROL CHANNEL Q-BIT

(75) Inventors: Pablo Alejandro Anigstein, Gillette, NJ (US); Prashanth Hande, Jersey City, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/034,940

(22) Filed: Feb. 25, 2011

(65) Prior Publication Data

US 2011/0142150 A1    Jun. 16, 2011

Related U.S. Application Data

(60) Division of application No. 11/487,225, filed on Jul. 14, 2006, now Pat. No. 7,925,291, which is a continuation-in-part of application No. 10/641,308, filed on Aug. 13, 2003, now Pat. No. 7,420,939.

(51) Int. Cl.
*H04B 7/00* (2006.01)
(52) U.S. Cl. ........ 455/522; 370/206; 370/208; 370/310; 375/260
(58) Field of Classification Search ............... 455/522
See application file for complete search history.

(56) References Cited

U.S. PATENT DOCUMENTS

| | | |
|---|---|---|
| 4,679,244 A | 7/1987 | Kawasaki et al. |
| 4,833,701 A | 5/1989 | Comroe et al. |
| 4,901,307 A | 2/1990 | Gilhousen et al. |
| 5,056,109 A | 10/1991 | Gilhousen et al. |
| 5,095,529 A | 3/1992 | Comroe et al. |
| 5,128,938 A | 7/1992 | Borras |
| 5,267,261 A | 11/1993 | Blakeney, II et al. |
| 5,311,543 A | 5/1994 | Schreiber |
| 5,325,432 A | 6/1994 | Gardeck et al. |
| 5,369,781 A | 11/1994 | Comroe et al. |
| 5,387,905 A | 2/1995 | Grube et al. |
| 5,420,909 A | 5/1995 | Ng et al. |
| 5,450,405 A | 9/1995 | Maher et al. |
| 5,461,645 A | 10/1995 | Ishii |

(Continued)

FOREIGN PATENT DOCUMENTS

CA    2442400 A1    11/2002

(Continued)

OTHER PUBLICATIONS

Cover, T.M. "Broadcast Channels" IEEE Transactions on Information Theory, IEEE Inc., New York, US, vol. IT-18, No. 1, Jan. 1972, pp. 2-14. XP000760860, ISSN: 0018-09448.

(Continued)

*Primary Examiner* — Hai Nguyen
(74) *Attorney, Agent, or Firm* — Donald C. Kordich

(57) ABSTRACT

Systems and methodologies are described that facilitate controlling transmission power of a wireless terminal. A downlink power control channel segment may include an Orthogonal Frequency Division Multiplexing (OFDM) tone-symbol that may comprise a first component and a second component. The first component may be an in-phase (I) component and the second component may be a quadrature (Q) component, for example. A power command may be transmitted in the first component. Further, information associated with a wireless terminal may be transmitted in the second component. The information associated with the wireless terminal may be, for instance, a portion of a scrambling mask associated with the wireless terminal.

28 Claims, 13 Drawing Sheets

U.S. PATENT DOCUMENTS

| | | | |
|---|---|---|---|
| 5,463,617 A | 10/1995 | Grube et al. | |
| 5,465,391 A | 11/1995 | Toyryla | |
| 5,473,605 A | 12/1995 | Grube et al. | |
| 5,491,835 A | 2/1996 | Sasuta et al. | |
| 5,511,232 A | 4/1996 | O'dea et al. | |
| 5,513,381 A | 4/1996 | Sasuta | |
| 5,542,108 A | 7/1996 | Sasuta | |
| 5,566,366 A | 10/1996 | Russo et al. | |
| 5,590,396 A | 12/1996 | Henry | |
| 5,594,948 A | 1/1997 | Talarmo et al. | |
| 5,610,559 A | 3/1997 | Dent | |
| 5,625,882 A | 4/1997 | Vook et al. | |
| 5,627,882 A | 5/1997 | Chien et al. | |
| 5,634,197 A | 5/1997 | Paavonen | |
| 5,710,982 A | 1/1998 | Laborde et al. | |
| 5,720,455 A * | 2/1998 | Kull et al. | 246/187 C |
| 5,771,224 A | 6/1998 | Seki et al. | |
| 5,809,401 A | 9/1998 | Meidan et al. | |
| 5,815,531 A | 9/1998 | Dent | |
| 5,831,479 A | 11/1998 | Leffel et al. | |
| 5,867,060 A | 2/1999 | Burkett, Jr. et al. | |
| 5,884,196 A | 3/1999 | Lekven et al. | |
| 5,923,651 A | 7/1999 | Struhsaker | |
| 5,982,760 A | 11/1999 | Chen | |
| 5,991,635 A | 11/1999 | Dent et al. | |
| 5,999,818 A * | 12/1999 | Gilbert et al. | 455/448 |
| 6,021,123 A | 2/2000 | Mimura | |
| 6,078,815 A | 6/2000 | Edwards | |
| 6,108,542 A | 8/2000 | Swanchara et al. | |
| 6,108,560 A | 8/2000 | Navaro et al. | |
| 6,125,148 A | 9/2000 | Frodigh et al. | |
| 6,125,150 A | 9/2000 | Wesel et al. | |
| 6,160,791 A | 12/2000 | Bohnke | |
| 6,167,270 A | 12/2000 | Rezaiifar et al. | |
| 6,185,259 B1 | 2/2001 | Dent | |
| 6,201,785 B1 | 3/2001 | Fouche et al. | |
| 6,222,851 B1 * | 4/2001 | Petry | 370/447 |
| 6,226,280 B1 * | 5/2001 | Roark et al. | 370/330 |
| 6,230,022 B1 | 5/2001 | Sakoda et al. | |
| 6,239,690 B1 | 5/2001 | Burbidge et al. | |
| 6,243,584 B1 | 6/2001 | O'byrne | |
| 6,259,685 B1 | 7/2001 | Rinne et al. | |
| 6,266,529 B1 | 7/2001 | Chheda | |
| 6,275,712 B1 | 8/2001 | Gray et al. | |
| 6,307,849 B1 | 10/2001 | Tiedemann, Jr. | |
| 6,308,080 B1 | 10/2001 | Burt et al. | |
| 6,321,095 B1 | 11/2001 | Gavette | |
| 6,334,047 B1 | 12/2001 | Andersson et al. | |
| 6,347,081 B1 | 2/2002 | Bruhn | |
| 6,377,803 B1 | 4/2002 | Ruohonen | |
| 6,385,261 B1 | 5/2002 | Tsuji et al. | |
| 6,396,803 B2 | 5/2002 | Hornsby et al. | |
| 6,400,703 B1 | 6/2002 | Park et al. | |
| 6,408,038 B1 | 6/2002 | Takeuchi | |
| 6,424,678 B1 | 7/2002 | Doberstein et al. | |
| 6,442,152 B1 | 8/2002 | Park et al. | |
| 6,456,604 B1 | 9/2002 | Lee et al. | |
| 6,456,627 B1 | 9/2002 | Frodigh et al. | |
| 6,470,030 B1 | 10/2002 | Park et al. | |
| 6,473,624 B1 | 10/2002 | Corbett et al. | |
| 6,496,543 B1 * | 12/2002 | Zehavi | 375/295 |
| 6,498,934 B1 | 12/2002 | Muller | |
| 6,538,985 B1 * | 3/2003 | Petry et al. | 370/203 |
| 6,546,252 B1 | 4/2003 | Jetzek et al. | |
| 6,553,019 B1 * | 4/2003 | Laroia et al. | 370/343 |
| 6,563,881 B1 | 5/2003 | Sakoda et al. | |
| 6,574,211 B2 * | 6/2003 | Padovani et al. | 370/347 |
| 6,587,510 B1 | 7/2003 | Minami et al. | |
| 6,609,008 B1 | 8/2003 | Whang et al. | |
| 6,611,506 B1 | 8/2003 | Huang et al. | |
| 6,657,988 B2 | 12/2003 | Toskala et al. | |
| 6,661,771 B1 | 12/2003 | Cupo et al. | |
| 6,690,936 B1 | 2/2004 | Lundh | |
| 6,694,147 B1 | 2/2004 | Viswanath et al. | |
| 6,721,289 B1 | 4/2004 | O'toole et al. | |
| 6,731,939 B1 | 5/2004 | Watanabe et al. | |
| 6,765,893 B1 | 7/2004 | Bayley | |
| 6,788,963 B2 | 9/2004 | Laroia et al. | |
| 6,801,759 B1 | 10/2004 | Saifuddin | |
| 6,804,521 B2 | 10/2004 | Tong et al. | |
| 6,904,283 B2 | 6/2005 | Li et al. | |
| 6,952,454 B1 * | 10/2005 | Jalali et al. | 375/260 |
| 6,961,582 B2 | 11/2005 | Su et al. | |
| 6,961,595 B2 | 11/2005 | Laroia et al. | |
| 6,967,937 B1 * | 11/2005 | Gormley | 370/330 |
| 6,978,149 B1 | 12/2005 | Morelli et al. | |
| 6,999,799 B1 | 2/2006 | Almassy | |
| 7,029,511 B2 | 4/2006 | Ichikawa et al. | |
| 7,054,296 B1 * | 5/2006 | Sorrells et al. | 370/338 |
| 7,069,319 B2 | 6/2006 | Zellner et al. | |
| 7,085,595 B2 | 8/2006 | Kitchin | |
| 7,123,662 B2 * | 10/2006 | Li et al. | 375/260 |
| 7,142,864 B2 * | 11/2006 | Laroia et al. | 455/450 |
| 7,143,299 B1 | 11/2006 | Rubinstein et al. | |
| 7,158,804 B2 | 1/2007 | Kumaran et al. | |
| 7,203,158 B2 * | 4/2007 | Oshima et al. | 370/208 |
| 7,209,524 B2 | 4/2007 | Chen | |
| 7,218,948 B2 * | 5/2007 | Laroia et al. | 455/522 |
| 7,257,103 B2 * | 8/2007 | Yeh et al. | 370/337 |
| 7,269,145 B2 | 9/2007 | Koo et al. | |
| 7,277,498 B2 | 10/2007 | Hanaoka et al. | |
| 7,302,227 B2 * | 11/2007 | Sakoda | 455/41.2 |
| 7,317,750 B2 | 1/2008 | Shattil | |
| 7,318,185 B2 * | 1/2008 | Khandani et al. | 714/758 |
| 7,321,569 B2 * | 1/2008 | Takagi et al. | 370/312 |
| 7,356,103 B2 * | 4/2008 | Nishikawa | 375/345 |
| 7,362,736 B2 * | 4/2008 | Suzuki | 370/338 |
| 7,363,039 B2 | 4/2008 | Laroia et al. | |
| 7,391,819 B1 | 6/2008 | Von Der Embse | |
| 7,398,111 B2 | 7/2008 | Laroia et al. | |
| 7,411,895 B2 | 8/2008 | Laroia et al. | |
| 7,420,939 B2 * | 9/2008 | Laroia et al. | 370/318 |
| 7,450,926 B2 | 11/2008 | Chang et al. | |
| 7,480,234 B1 * | 1/2009 | Hart et al. | 370/208 |
| 7,512,424 B2 | 3/2009 | Hossain et al. | |
| 7,522,553 B2 | 4/2009 | Kang et al. | |
| 7,542,437 B1 | 6/2009 | Redi et al. | |
| 7,558,572 B2 * | 7/2009 | Anigstein | 455/435.2 |
| 7,620,021 B1 * | 11/2009 | Chen et al. | 370/337 |
| 7,627,770 B2 | 12/2009 | Jones | |
| 7,653,035 B2 * | 1/2010 | Lin et al. | 370/338 |
| 7,668,573 B2 | 2/2010 | Laroia et al. | |
| 7,720,112 B2 * | 5/2010 | Morris | 370/535 |
| 7,746,896 B2 * | 6/2010 | Venkatachalam | 370/468 |
| 7,778,643 B2 | 8/2010 | Laroia et al. | |
| 7,925,291 B2 * | 4/2011 | Anigstein et al. | 455/522 |
| 8,099,099 B2 * | 1/2012 | Laroia et al. | 455/450 |
| 2001/0031639 A1 | 10/2001 | Makipaa | |
| 2002/0012334 A1 | 1/2002 | Strawczynski et al. | |
| 2002/0031189 A1 | 3/2002 | Hiben et al. | |
| 2002/0077152 A1 | 6/2002 | Johnson et al. | |
| 2002/0090942 A1 | 7/2002 | Karabinis et al. | |
| 2002/0136157 A1 | 9/2002 | Takaoka et al. | |
| 2002/0145985 A1 | 10/2002 | Love et al. | |
| 2002/0172165 A1 | 11/2002 | Rosen et al. | |
| 2003/0037033 A1 | 2/2003 | Nyman et al. | |
| 2003/0053524 A1 | 3/2003 | Dent | |
| 2003/0086379 A1 | 5/2003 | Terry et al. | |
| 2003/0086381 A1 | 5/2003 | Terry et al. | |
| 2003/0090093 A1 | 5/2003 | Sato | |
| 2003/0152059 A1 | 8/2003 | Odman | |
| 2003/0189997 A1 | 10/2003 | Shanbhag et al. | |
| 2003/0232619 A1 | 12/2003 | Fraser | |
| 2004/0005904 A1 * | 1/2004 | Wolf et al. | 455/519 |
| 2004/0062274 A1 | 4/2004 | Hakansson et al. | |
| 2004/0097231 A1 | 5/2004 | Marque-Pucheu | |
| 2004/0100897 A1 | 5/2004 | Shattil | |
| 2004/0116110 A1 | 6/2004 | Amerga et al. | |
| 2004/0184567 A1 | 9/2004 | McDonough et al. | |
| 2004/0189603 A1 | 9/2004 | Arrigo et al. | |
| 2004/0203727 A1 | 10/2004 | Abiri et al. | |
| 2004/0203838 A1 | 10/2004 | Joshi et al. | |
| 2004/0219925 A1 | 11/2004 | Ahya et al. | |
| 2004/0229625 A1 * | 11/2004 | Laroia et al. | 455/450 |
| 2005/0002326 A1 | 1/2005 | Ling et al. | |
| 2005/0002461 A1 | 1/2005 | Giannakis et al. | |
| 2005/0002463 A1 | 1/2005 | Sakamoto | |

| | | | |
|---|---|---|---|
| 2005/0018784 A1 | 1/2005 | Kurobe et al. | |
| 2005/0036441 A1* | 2/2005 | Laroia et al. | 370/203 |
| 2005/0047357 A1 | 3/2005 | Benveniste | |
| 2005/0049013 A1 | 3/2005 | Chang et al. | |
| 2005/0054302 A1 | 3/2005 | Hanaoka et al. | |
| 2005/0058089 A1 | 3/2005 | Vijayan et al. | |
| 2005/0058115 A1 | 3/2005 | Levin et al. | |
| 2005/0105593 A1 | 5/2005 | Dateki et al. | |
| 2005/0118981 A1 | 6/2005 | Laroia et al. | |
| 2005/0136960 A1* | 6/2005 | Timus et al. | 455/522 |
| 2005/0147190 A1* | 7/2005 | Nishikawa | 375/343 |
| 2005/0153751 A1 | 7/2005 | Bultan et al. | |
| 2005/0169166 A1* | 8/2005 | Okada et al. | 370/208 |
| 2005/0176436 A1 | 8/2005 | Mantravadi et al. | |
| 2005/0181799 A1* | 8/2005 | Laroia et al. | 455/450 |
| 2005/0233710 A1* | 10/2005 | Lakkis et al. | 455/102 |
| 2006/0023666 A1* | 2/2006 | Jalali et al. | 370/334 |
| 2006/0080344 A1* | 4/2006 | McKibben et al. | 707/100 |
| 2006/0087993 A1 | 4/2006 | Sengupta et al. | |
| 2006/0093067 A1* | 5/2006 | Jalali et al. | 375/299 |
| 2006/0114813 A1* | 6/2006 | Seki et al. | 370/208 |
| 2006/0120269 A1* | 6/2006 | Kim et al. | 370/208 |
| 2006/0172747 A1 | 8/2006 | Mohammed | |
| 2006/0203713 A1 | 9/2006 | Laroia et al. | |
| 2006/0246840 A1 | 11/2006 | Borowski et al. | |
| 2006/0262739 A1 | 11/2006 | Ramirez et al. | |
| 2006/0269005 A1 | 11/2006 | Laroia et al. | |
| 2007/0025283 A1 | 2/2007 | Koslov | |
| 2007/0082696 A1* | 4/2007 | Wang | 455/550.1 |
| 2007/0173202 A1* | 7/2007 | Binder et al. | 455/68 |
| 2007/0201346 A1* | 8/2007 | Geile et al. | 370/203 |
| 2007/0223365 A1* | 9/2007 | Tsfaty et al. | 370/208 |
| 2007/0230403 A1* | 10/2007 | Douglas et al. | 370/334 |
| 2007/0242764 A1* | 10/2007 | Anigstein et al. | 375/260 |
| 2007/0259673 A1 | 11/2007 | Willars et al. | |
| 2007/0286080 A1 | 12/2007 | Kim et al. | |
| 2007/0291728 A1 | 12/2007 | Dalsgaard et al. | |
| 2007/0291863 A1* | 12/2007 | Saed | 375/260 |
| 2008/0013468 A1* | 1/2008 | Anigstein et al. | 370/310 |
| 2008/0027586 A1 | 1/2008 | Hern et al. | |
| 2008/0046132 A1 | 2/2008 | Dalsgaard et al. | |
| 2008/0101268 A1 | 5/2008 | Sammour et al. | |
| 2008/0102880 A1 | 5/2008 | Gholmieh et al. | |
| 2008/0123576 A1 | 5/2008 | Son et al. | |
| 2008/0130543 A1 | 6/2008 | Singh et al. | |
| 2008/0146146 A1* | 6/2008 | Binder et al. | 455/20 |
| 2008/0165698 A1 | 7/2008 | Dalsgaard et al. | |
| 2008/0182580 A1 | 7/2008 | Laroia et al. | |
| 2008/0212710 A1* | 9/2008 | Boehlke et al. | 375/295 |
| 2008/0261530 A1 | 10/2008 | Gerstenberger et al. | |
| 2008/0285488 A1* | 11/2008 | Walton et al. | 370/280 |
| 2008/0285669 A1* | 11/2008 | Walton et al. | 375/260 |
| 2008/0285670 A1* | 11/2008 | Walton et al. | 375/260 |
| 2009/0005095 A1 | 1/2009 | Chun et al. | |
| 2009/0122736 A1 | 5/2009 | Damnjanovic et al. | |
| 2009/0245241 A1* | 10/2009 | Martin | 370/360 |
| 2009/0274084 A1 | 11/2009 | Terry et al. | |
| 2009/0296662 A1 | 12/2009 | Laroia et al. | |
| 2010/0027502 A1* | 2/2010 | Chen et al. | 370/330 |
| 2010/0029212 A1* | 2/2010 | Malladi et al. | 455/63.1 |
| 2010/0093363 A1* | 4/2010 | Malladi | 455/452.2 |
| 2010/0118747 A9* | 5/2010 | Anigstein et al. | 370/310 |
| 2010/0130220 A1 | 5/2010 | Laroia et al. | |
| 2010/0182942 A1 | 7/2010 | Kim et al. | |
| 2010/0234059 A1* | 9/2010 | Yang et al. | 455/522 |
| 2010/0262404 A1 | 10/2010 | Bertness | |
| 2010/0267420 A1 | 10/2010 | Chou | |
| 2011/0142150 A1* | 6/2011 | Anigstein et al. | 375/260 |
| 2011/0195697 A1 | 8/2011 | Kim et al. | |

FOREIGN PATENT DOCUMENTS

| | | |
|---|---|---|
| DE | 2330263 | 1/1975 |
| EP | 0923202 | 6/1999 |
| EP | 0961515 A1 | 12/1999 |
| EP | 0986278 A1 | 3/2000 |
| EP | 1022920 A2 | 7/2000 |
| EP | 1079578 | 2/2001 |
| EP | 1361686 | 11/2003 |
| EP | 1592176 A1 | 11/2005 |
| JP | 06511371 | 12/1994 |
| JP | 8162998 | 6/1996 |
| JP | 10112695 | 4/1998 |
| JP | 10313286 | 11/1998 |
| JP | 11178050 | 7/1999 |
| JP | 11196043 | 7/1999 |
| JP | 2001111522 | 4/2001 |
| KR | 2000011693 | 2/2000 |
| KR | 100414932 B1 | 12/2003 |
| RU | 2122288 | 11/1998 |
| RU | 2168277 | 5/2001 |
| RU | 2005102111 | 10/2005 |
| TW | 200415887 | 8/2004 |
| TW | 200421801 | 10/2004 |
| WO | WO9512297 | 5/1995 |
| WO | WO9626620 A1 | 8/1996 |
| WO | WO9627993 A1 | 9/1996 |
| WO | WO9712475 A1 | 4/1997 |
| WO | WO97046038 | 12/1997 |
| WO | WO9938278 | 7/1999 |
| WO | WO0010353 A1 | 2/2000 |
| WO | WO0038457 A1 | 6/2000 |
| WO | WO0067394 A2 | 11/2000 |
| WO | WO0074292 | 12/2000 |
| WO | WO03001726 | 1/2003 |
| WO | WO03065628 | 8/2003 |
| WO | WO2004071020 A1 | 8/2004 |
| WO | WO2004075442 | 9/2004 |
| WO | WO2004098093 A1 | 11/2004 |
| WO | WO2004105337 | 12/2004 |
| WO | WO2005020490 | 3/2005 |

OTHER PUBLICATIONS

Goldsmith, Andrea. "Multiuser Capacity of Cellular Time-Varying Channels," Signals, Systems and Computers; 1994. 1994 Conference Record of the Twenty-Eighth Asilomar Conference in Pacific Grove, CA, USA Oct. 31-Nov. 2, 1994, Los Alamitos, CA, USA, IEEE Comput. Soc, US, vol. 1, (Oct. 31, 1994), pp. 83-88, XP010148618 ISBN: 978-0-8186-6405-2, p. 85, left-hand col.

International Search Report and Written Opinion—PCT/US07/073380, International Search Authority—European Patent Office—Dec. 11, 2007.

Jianming, Zhu et al.: "Ergodic Capacities for Downlink of MC-CDMA System with Different Detection and Resource Allocation Strategies," Conference Record of the 36th Asilomar Conference on Signals, Systems, & Computers. Pacific Grove, CA, Nov. 3-6, 2002; [Asilomar Conference on Signals, Systems and Computers], New York, NY IEEE, US, vol. 2, (Nov. 3, 2002), pp. 1458-1462, XP010638439, ISBN: 978-0-7803-7576-5, p. 1461, right-hand col., paragraph 1.

Pradhan, S. Sandeep et al.: "Efficient Layered Video Delivery Over Multicarrier Systems Using Optimized Embedded Modulation," Image Processing, 1997. Proceedings, International Conference on Santa Barbara, CA, USA Oct. 26-29, 1997, Los Alamitos, CA, USA, IEEE Comput. Soc. US, vol. 3, (Oct. 26, 1997), pp. 452-455, XP010253736, ISBN: 978-0-8186-8183-7, p. 452, right-hand col., paragraphs 1,2 and p. 454, section 3.3.

* cited by examiner

USER SPECIFIC DOWNLINK POWER CONTROL CHANNEL Q-BIT

CLAIM OF PRIORITY UNDER 35 U.S.C. §120

The present Application for Patent is a Divisional of patent application Ser. No. 11/487,225 entitled "USER SPECIFIC DOWNLINK POWER CONTROL CHANNEL Q-BIT" filed Jul. 14, 2006, allowed, which is a Continuation-in-Part of patent application Ser. No. 10/641,308 entitled "METHODS AND APPARATUS OF POWER CONTROL IN WIRELESS COMMUNICATION SYSTEMS" filed Aug. 13, 2003, now U.S. Pat. No. 7,420,939 issued Sep. 2, 2008, and assigned to the assignee hereof and hereby expressly incorporated by reference herein.

BACKGROUND

I. Field

The following description relates generally to wireless communications, and more particularly to providing verification information associated with a wireless terminal over a downlink power control channel in a wireless communication system.

II. Background

Wireless communication systems are widely deployed to provide various types of communication; for instance, voice and/or data may be provided via such wireless communication systems. A typical wireless communication system, or network, can provide multiple users access to one or more shared resources. For instance, a system may use a variety of multiple access techniques such as Frequency Division Multiplexing (FDM), Time Division Multiplexing (TDM), Code Division Multiplexing (CDM), and others.

Common wireless communication systems employ one or more base stations that provide a coverage area. A typical base station can transmit multiple data streams for broadcast, multicast and/or unicast services, wherein a data stream may be a stream of data that can be of independent reception interest to a wireless terminal. A wireless terminal within the coverage area of such base station can be employed to receive one, more than one, or all the data streams carried by the composite stream. Likewise, a wireless terminal can transmit data to the base station or another wireless terminal.

Wireless communication systems commonly provide power control for wireless terminal(s). For instance, a base station may measure power level(s) associated with wireless terminal(s) and evaluate whether to adjust such power level(s). The base station may effectuate power level adjustment determinations tailored to each wireless terminal, and provide wireless terminal specific control information back to each wireless terminal. However, conventional techniques for differentiating control information corresponding to each of the wireless terminals may be difficult and/or error prone. Power control channels providing power control information to disparate wireless terminals may be similar, such as in an Orthogonal Frequency Division Multiplexing (OFDM) system. Thus, for example, two or more wireless terminals may improperly both obtain and decode power control information transmitted via one downlink power control channel intended for one of the wireless terminals; hence, power level(s) associated with wireless terminals for which the power control information is unintended may be altered.

Further, conventional techniques may fail to account for situations where a base station and a wireless terminal lack synchronization as to a state of the wireless terminal. According to an illustration, the base station may transmit information to the wireless terminal to modify a state associated with the wireless terminal. However, an error may occur such that the wireless terminal fails to transition states in accordance with the transmitted information, and thus, a mismatch may exist between an actual state of the wireless terminal and the base station's view of the state of that wireless terminal.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating control of transmission power of a wireless terminal. A downlink power control channel segment may include an Orthogonal Frequency Division Multiplexing (OFDM) tone-symbol that may comprise a first component and a second component. The first component may be an in-phase (I) component and the second component may be a quadrature (Q) component, for example. A power command may be transmitted in the first component. Further, information associated with a wireless terminal may be transmitted in the second component. The information associated with the wireless terminal may be, for instance, a portion of a scrambling mask associated with the wireless terminal.

According to related aspects, a method that facilitates controlling a transmission power and detecting state disconnect of a first wireless terminal is described herein. The method may comprise assigning at least one ON identifier to the first wireless terminal, the at least one ON identifier being associated with a first predetermined subset of transmission units and a second predetermined subset of the transmission units. Further, the method may include transmitting a power command in at least one transmission unit of the first subset of transmission units. The method may also include transmitting information as a function of a terminal identifier of the first wireless terminal in at least one transmission unit of the second subset of transmission units.

Another aspect relates to a wireless communications apparatus that may include a memory that retains a terminal identifier associated with a wireless terminal and at least one ON identifier allocated to the wireless terminal, the at least one ON identifier being associated with a first predetermined subset of transmission units and a second predetermined subset of the transmission units. Further, a processor may transmit a power command in at least one transmission unit of the first subset of transmission units and transmit information from the terminal identifier in at least one transmission unit of the second subset of transmission units.

Yet another aspect relates to a wireless communications apparatus for verifying an identity and controlling transmission power of a wireless terminal. The wireless communications apparatus may include means for assigning a ON identifier to the wireless terminal, the ON identifier being associated with a first predetermined subset of transmission units and a second predetermined subset of the transmission units. Further, the wireless communications apparatus may comprise means for transmitting a power command in at least one transmission unit of the first subset of the transmission units and means for transmitting information associated with the wireless terminal based on a terminal identifier in at least one transmission unit of the second subset of the transmission units.

Still another aspect relates to a machine-readable medium having stored thereon machine-executable instructions for assigning an ON identifier to a wireless terminal, the ON identifier being associated with a first predetermined subset of transmission units and a second predetermined subset of the transmission units. The machine-readable medium may further have stored thereon machine-executable instructions for transmitting a power command in at least one transmission unit of the first subset of transmission units and transmitting information related to the wireless terminal based upon a terminal identifier in at least one transmission unit of the second subset of transmission units.

In accordance with another aspect, a processor is described herein, wherein the processor may execute instructions for assigning an ON identifier to a wireless terminal related to a first predetermined subset of transmission units and a second predetermined subset of transmission units. Further, the processor may execute instructions for transmitting a power command in at least one transmission unit of the first subset of transmission units. Moreover, the processor may execute instructions for transmitting information based at least in part upon a terminal identifier of the wireless terminal in at least one transmission unit of the second subset of transmission units.

According to other aspects, a method that facilitates evaluating wireless terminal specific power control information is described herein. The method may include receiving an ON identifier allocating a first predetermined subset of transmission units and a second predetermined subset of transmission units, receiving a power command in at least one transmission unit of the first subset of transmission units, and receiving information based at least in part upon a terminal identifier associated with a wireless terminal in at least one transmission unit of the second subset of transmission units. Further, the method may comprise comparing the received information associated with the wireless terminal to expected information associated with the wireless terminal and adjusting a power level based upon the power command when the received information matches the expected information.

Still another aspect relates to a wireless communications apparatus that may include a memory that retains an expected terminal identifier that corresponds to a wireless terminal and an ON identifier associated with a first predetermined subset of transmission units and a second predetermined subset of transmission units. Additionally, a processor may receive a power command in at least one transmission unit of the first subset of transmission units, receive information based upon a terminal identifier in at least one transmission unit of the second subset of transmission units, compare the received information to expected information associated with the expected terminal identifier, and adjust a power level based upon the comparison.

Another aspect relates to a wireless communications apparatus for controlling transmission power of a wireless terminal. The wireless communications apparatus may include means for obtaining an ON identifier associated with a first predetermined subset of transmission units and a second predetermined subset of the transmission units; means for receiving a power command in at least one transmission unit of the first subset of transmission units; and means for receiving information based at least in part upon a first terminal identifier in at least one transmission unit of the second subset of transmission units. Further, the wireless communications apparatus may comprise means for evaluating whether the received information correlates to expected information associated with a second terminal identifier related to the wireless terminal and means for performing error recovery upon identifying a lack of correlation between the received information and the expected information.

Yet another aspect relates to a machine-readable medium having stored thereon machine-executable instructions for obtaining an ON identifier related to a first subset of transmission units and a second subset of transmission units, receiving a power command fielding at least one transmission unit of the first subset of transmission units, and receiving information associated with a first terminal identifier in at least one transmission unit of the second subset of transmission units. Further, the machine-readable medium may have stored thereon machine-executable instructions for determining whether the received information associated with the first terminal identifier matches expected information associated with a second terminal identifier and performing error recovery when the received information fails to match the expected information.

In accordance with another aspect, a processor is described herein, wherein the processor may execute instructions for obtaining an ON identifier associated with a first predetermined subset of transmission units and a second predetermined subset of transmission units, receiving a power command in at least one transmission unit of the first subset of transmission units, and receiving information based at least in part upon a first terminal identifier in at least one transmission unit of the second subset of transmission units. Moreover, the processor may execute instructions for comparing the received information associated with the first terminal identifier with expected information associated with a second terminal identifier assigned to a wireless terminal and adjusting a power level based on the power command while the received information corresponds to the expected information.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
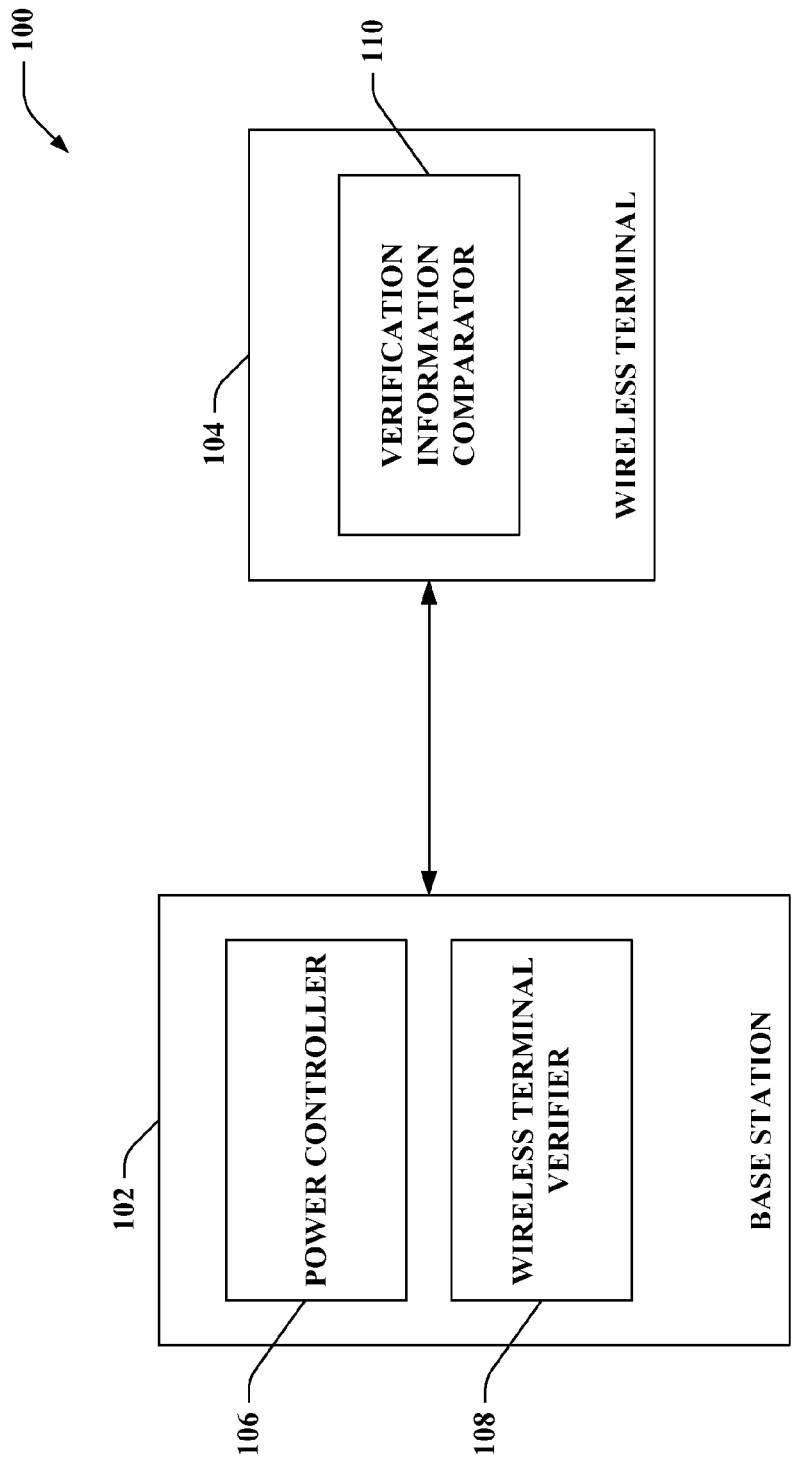
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

Furthermore, various embodiments are described herein in connection with a wireless terminal. A wireless terminal may refer to a device providing voice and/or data connectivity to a user. A wireless terminal may be connected to a computing device such as a laptop computer or desktop computer, or it may be a self contained device such as a personal digital assistant (PDA). A wireless terminal can also be called a system, a subscriber unit, a subscriber station, mobile station, mobile, remote station, access point, remote terminal, access terminal, user terminal, user agent, user device, or user equipment. A wireless terminal may be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem.

A base station (e.g., access point) may refer to a device in an access network that communicates over the air-interface, through one or more sectors, with wireless terminals. The base station may act as a router between the wireless terminal and the rest of the access network, which may include an IP network, by converting received air-interface frames to IP packets. The base station also coordinates management of attributes for the air interface.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 can comprise a base station 102 that receives, transmits, repeats, etc., wireless communication signals to a wireless terminal 104. Further, it is contemplated that system 100 may include a plurality of base stations similar to base station 102 and/or a plurality of wireless terminals similar to wireless terminal 104. Base station 102 can comprise a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art. Base station 102 may be a fixed station and/or mobile. Wireless terminal 104 can be, for example, a cellular phone, a smart phone, a laptop, a handheld communication device, a handheld computing device, a satellite radio, a global positioning system, a PDA, and/or any other suitable device for communicating over wireless communication system 100. Also, wireless terminal 104 may be fixed or mobile.

Wireless terminal 104 may communicate with base station 102 (and/or disparate base station(s)) on a downlink and/or an uplink channel at any given moment. The downlink refers to the communication link from base station 102 to wireless terminal 104, and the uplink channel refers to the communication link from wireless terminal 104 to base station 102. Base station 102 may further communicate with other base station(s) and/or any disparate devices (e.g., servers) (not shown) that may perform functions such as, for example, authentication and authorization of wireless terminal 104, accounting, billing, and so on.

Base station 102 may further include a power controller 106 and a wireless terminal verifier 108. Power controller 106 may measure a power level associated with wireless terminal 104 (and/or any disparate wireless terminals). Further, power controller 106 may transmit power commands to wireless terminal 104 to facilitate adjusting the power level. For instance, power controller 106 may transmit a power command in one or more transmission units associated with a first subset of transmission units. The power commands, for instance, may indicate to increase a power level, decrease a power level, remain at a power level, and the like. Upon receipt of power commands to increase or decrease power, wireless terminal 104 may alter an associated power level a fixed (e.g., preset) amount, or a fixed increment. Further, wireless terminal verifier 108 may transmit information as a function of a terminal identifier related to a wireless terminal (e.g., wireless terminal 104) in one or more transmission units associated with a second subset of transmission units. Moreover, one or more ON identifiers may be assigned to each wireless terminal when in session ON state and the ON identifiers may be associated with the first subset and the second subset of transmission units.

Power controller 106 may transmit power commands over a downlink power control channel (DLPCCH). Pursuant to an example, resources may be assigned to wireless terminal 104 by base station 102 as wireless terminal 104 accesses a session ON state; such resources may include particular DLPCCH segments, one or more ON identifiers, etc. The DLPCCH may be utilized by a base station sector attachment point (e.g., employing power controller 106) to transmit downlink power control messages to control transmission power of wireless terminal 104. Each DLPCCH segment may include one tone in an Orthogonal Frequency Division Multiplexing (OFDM) symbol, carrying a modulation symbol value comprising an in-phase (I) component (e.g., real) and a quadrature (Q) component (e.g., imaginary). In the following, a tone in an OFDM symbol is referred to as a tone-symbol. Each given DLPCCH segment in a recurring structure may be directed to a particular wireless terminal (e.g., wireless terminal 104) in accordance with a mapping function, where such wireless terminal may be identifiable by an identifier (e.g., ON identifier, wtOnID, session ON ID) and/or a mask (e.g., wtONMASK). Power controller 106 may insert power commands in a first component (e.g., I component, Q component, or I field and Q field) of the transmitted symbol associated with a DLPCCH segment. Thus, the I component (or Q component) may carry the power control message directing wireless terminal 104 (and/or any disparate wireless terminal) to adjust an associated transmission power.

Wireless terminal verifier 108 may transmit information associated with a wireless terminal (e.g., wireless terminal 104) to which the power commands correspond along with the power commands transferred by power controller 106. For example, wireless terminal verifier 108 may transmit information as a function of a terminal identifier (e.g., scrambling mask) associated with the wireless terminal (e.g., wireless terminal 104). Wireless terminal verifier 108 may transfer such information over the DLPCCH. Pursuant to an illustration, information associated with wireless terminal 104 may be transmitted over the DLPCCH with a subset of the power command transmissions from power controller 106. Further, wireless terminal verifier 108 may incorporate wireless terminal related information in a second component (e.g., Q component, I component) of an OFDM tone-symbol. For instance, the first component may be the I component and the second component may be the Q component, or vice versa. Although the following describes including power commands with the I component and wireless terminal related information with the Q component, it is to be appreciated that the power controller 106 may utilize the Q component and the wireless terminal 108 may employ the I component.

A subset (e.g., one out of every eight) of the symbols transmitted by base station 102 to wireless terminal 104 may include verification information in the Q component (e.g., Q-bit) inserted by wireless terminal verifier 108. Wireless terminal verifier 108 may set the Q component to 0 when base station 102 believes a wireless terminal (e.g., wireless terminal 104) to be absent (e.g., no wireless terminal associated with resources such as a session ON ID that maps to the DLPCCH segment). Also, wireless terminal verifier 108 may insert 1 or −1 in the Q component when a wireless terminal (e.g., wireless terminal 104) is present (e.g., associated with resources such as a session ON ID that maps to the DLPCCH segment).

Wireless terminal 104 may further include a verification information comparator 110 that evaluates the received information associated with wireless terminal 104. Verification information comparator 110 may analyze the received information to determine whether wireless terminal 104 is utilizing resources as set forth by base station 102; thus, verification information comparator 110 may evaluate information included in the Q component of symbols transmitted over the DLPCCH. For instance, base station 102 may have assigned identifier(s) (e.g., session ON ID) to wireless terminal 104, and verification information comparator 110 may analyze whether wireless terminal 104 employs appropriate resources associated with the assigned identifier(s). According to other examples, verification information comparator 110 may determine whether wireless terminal 104 is utilizing segments of the DLPCCH allocated by base station 102 and/or whether base station 102 has reclaimed resources (e.g., session ON ID) previously assigned to wireless terminal 104.

Figure 2:
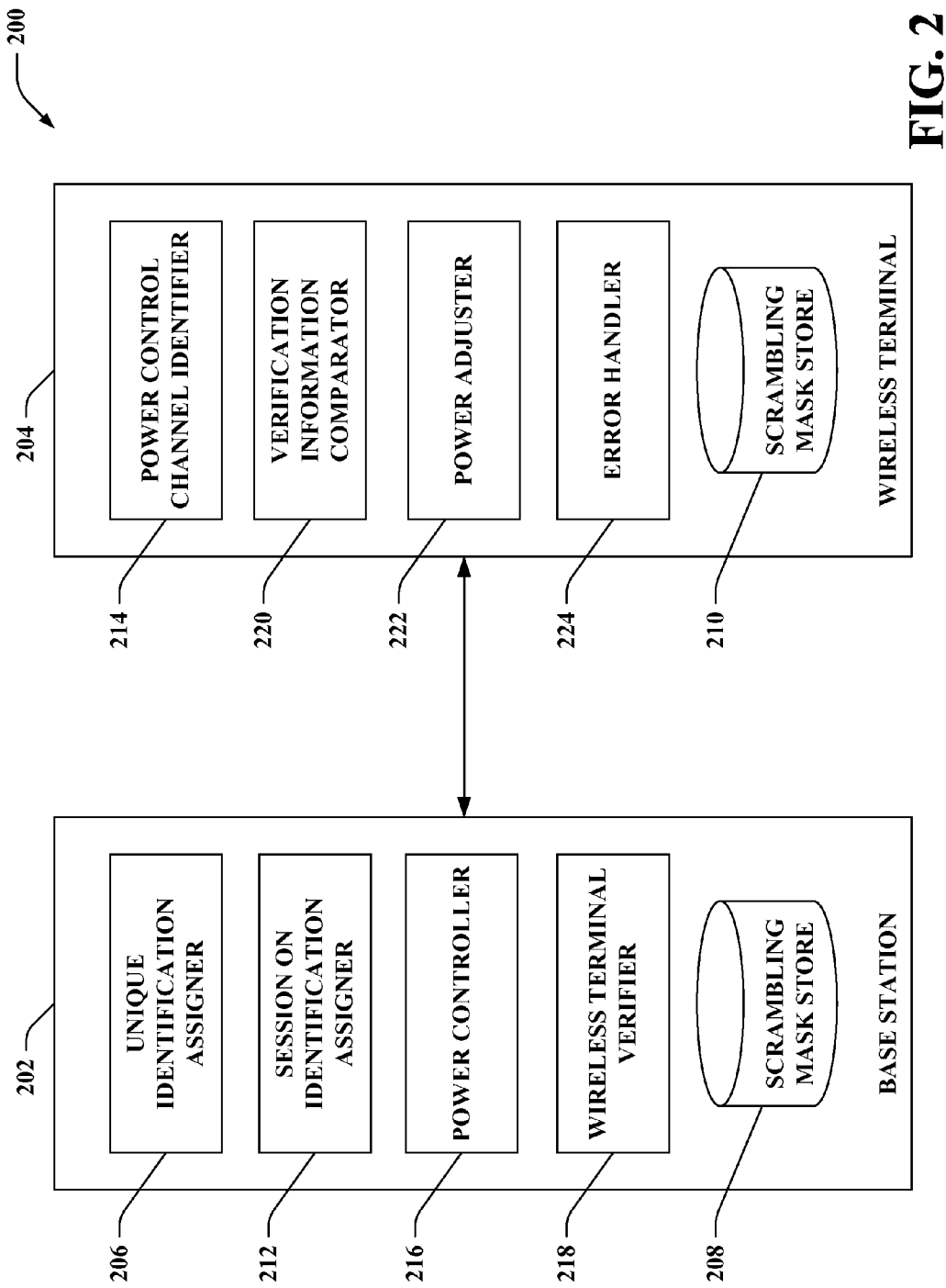
FIG. 2 is an illustration of a system that facilitates employing user specific information to verify resource utilization associated with a wireless terminal.

Referring now to FIG. 2, illustrated is a system 200 that facilitates employing user specific information to verify resource utilization associated with a wireless terminal. System 200 includes a base station 202 and a wireless terminal 204; however, it is contemplated that any number of similar base station(s) and/or wireless terminal(s) may additionally be employed in connection with system 200. Base station 202 further comprises a unique identification assigner 206. When wireless terminal 204 enters a system associated with base station 202 (e.g., provides a handoff request to base station 202), unique identification assigner 206 may assign a scrambling mask to wireless terminal 204. The scrambling mask allocated by unique identification assigner 206 distinguishes wireless terminal 204 from disparate wireless terminals associated with base station 202 (e.g., wireless terminals in any state related to base station 202). The scrambling mask may continue to be assigned to wireless terminal 204 as long as wireless terminal 204 is associated with a state (e.g., ON, HOLD, SLEEP, SPLIT-TONE ON, etc.) related to base station 202. Thus, as wireless terminal 204 transitions between various states (e.g., from ON to HOLD, etc.), the scrambling mask that uniquely corresponds to wireless terminal 204 remains allocated to wireless terminal 204. The scrambling mask may be a sequence of binary values including any number of bits. According to an example, the scrambling mask may be 16 bits; however, the claimed subject matter is not so limited.

Unique identification assigner 206 (and/or base station 202) may provide the scrambling mask to wireless terminal 204 such as, for example, during a handoff response. Additionally or alternatively, unique identification assigner 206 (and/or base station 202) may provide information to wireless terminal 204 (e.g., during a handoff response) that enables wireless terminal 204 to derive the unique scrambling mask. Base station 202 and wireless terminal 204 may each retain copies of the scrambling mask associated with wireless terminal 204 in scrambling mask stores 208 and 210, respectively.

It will be appreciated that the data stores (e.g., scrambling mask store 208, scrambling mask store 210, etc.) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The scrambling mask stores 208-210 of the subject systems and methods is intended to comprise, without being limited to, these and any other suitable types of memory.

Base station 202 may additionally include a session on identification assigner 212. As wireless terminal 204 accesses a session ON state associated with base station 202, session on identification assigner 212 may assign a session ON identification (SON ID) to wireless terminal 204. The SON ID may map to certain dedicated resources that may be employed by a corresponding wireless terminal (e.g., wireless terminal 204) while in a session ON state. For instance, the SON ID may relate to particular downlink power control channel segments from a set of downlink power control channel segments. Pursuant to another illustration, as wireless terminal 204 transitions from a session ON state to a session HOLD state, the session on identification assigner 212 may facilitate removing the assignment of the SON ID to wireless terminal 204; thus, while in session ON wireless terminal 204 may be assigned a SON ID and during session HOLD wireless terminal 204 lacks a SON ID.

The session on identification assigner 212 (and/or base station 202) provides the SON ID to wireless terminal 204. Wireless terminal 204 may further include a power control channel identifier 214 that utilizes the assigned SON ID to determine downlink power control channel segments allocated to wireless terminal 204. For example, base station 202 may support 31 wireless terminals in session ON state; thus, power control channel identifier 214 may locate 1 out of every 31 periodic, downlink power control segments that map to the corresponding, assigned SON ID. According to another illustration, base station 202 may support 93 wireless terminals in a SPLIT-TONE ON state and similarly power control channel identifier 214 may determine the allocated downlink power control resources that correspond to the SON ID.

Although wireless terminal 204 may identify power control channel resources based upon the SON ID utilizing power control channel identifier 214, errors may occur that lead to a mismatch between base station 202 and wireless terminal 204. For example, more than one wireless terminal may believe that they are each assigned the same SON ID; thus, two wireless terminals may receive symbols associated with the same downlink power control segments, which may be intended for one or neither of the wireless terminals. According to another illustration, base station 202 may transmit a signal to wireless terminal 204 to facilitate transitioning wireless terminal 204 from session ON to session HOLD; however, wireless terminal 204 may fail to obtain such indication. Thus, base station 202 may believe that the SON ID assigned to wireless terminal 204 has been reclaimed, while wireless terminal 204 continues to utilize the SON ID to obtain power control commands (e.g., provided from a power controller 216 of base station 202).

Base station 202 additionally includes power controller 216 and a wireless terminal verifier 218, both of which enable transmitting complex symbols with I and Q components through the DLPCCH. Power controller 216 may incorporate power commands in a first component (e.g., I component, Q component) of complex symbols transmitted to wireless terminal 204 as previously described. Wireless terminal verifier 218 may include verification information in a second component (e.g., Q component, I component). By way of example, power controller 216 may include power commands in an I component of a transmission unit and wireless terminal verifier 218 may include verification information in a Q component of the transmission unit, which may be referred to as a Q-bit. For instance, wireless terminal verifier 218 may include Q-bit data with a subset of the complex symbols transferred to wireless terminal 204. By way of example and not limitation, Q-bit data may be included by wireless terminal verifier 218 in one out of eight power control symbols directed to a particular wireless terminal.

The scrambling mask retained in scrambling mask store 208 may be utilized by wireless terminal verifier 218. For example, wireless terminal verifier 218 may include one bit from the scrambling mask in a power control symbol (e.g., within the Q component). An index value (k) may be associated with the scrambling mask to identify a bit position (kth bit position) within the scrambling mask assigned to wireless terminal 204 to incorporate in a particular Q component. The value ($Z_k$) of the kth bit position of the scrambling mask determines the value of the Q component (e.g., $Z_k=0$ corresponds to Q component=1, $Z_k=1$ corresponds to Q component of −1) associated with the complex symbol.

Power controller 216 and/or wireless terminal verifier 218 may utilize information obtained from wireless terminal 204 to adjust transmit power level(s) associated with the first and second components, respectively. For example, wireless terminal 204 may measure a signal to noise ratio (SNR) on pilot symbols transmitted at fixed powers from base station 202 and the SNR may be reported to base station 202 from wireless terminal 204 through an uplink dedicated control channel (ULDCCH). Based upon the reported SNR (and assuming SNR conditions have not significantly changed since reporting), power controller 216 may transmit on the I component and/or wireless terminal verifier 218 may transmit on the Q component (or vice versa) at such a power so as to be received by wireless terminal 204 at a fixed SNR of 6 dB; however, the claimed subject matter is not so limited. By way of illustration, if wireless terminal 204 reports a SNR to be X dB to base station 202, then base station 202 (and/or wireless terminal verifier 218) may transmit a Q-bit symbol at a power substantially equal to a fixed transmit power of pilots plus (6−X) dB.

Wireless terminal 204 may further include a verification information comparator 220 that obtains the transmitted complex symbol and compares the Q-bit of the transmitted symbol with data from the scrambling mask retained in scrambling mask store 210. Verification information comparator 220 may similarly employ the index value to identify a bit position within the retained scrambling mask upon which to base the comparison. Further, verification information comparator 220 may determine whether the received Q-bit matches the expected bit from the stored copy of the scrambling mask. Also, verification information comparator 220 may identify a subset of symbols directed to wireless terminal 204 that are expected to include information in the Q component.

Wireless terminal 204 may also include a power adjuster 222 and an error handler 224. Power adjuster 222 may modify a power level of wireless terminal 204 based upon received data included in the I component of the complex symbols. According to an example, power adjuster 222 may alter the power level in accordance with the I component (e.g., increase, decrease, remain at same level) when a received symbol lacks Q-bit information when verification information comparator 204 does not expect to receive such information in the Q component. When verification information comparator 220 expects receipt of information in the Q component, and if such information is lacking (e.g., indicating that base station 202 believes no wireless terminal occupies the associated DLPCCH resources), power adjuster 222 may decrease a power level of wireless terminal 204. Moreover, when verification information comparator 220 determines that the received and expected scrambling mask bits do not match, power adjuster 222 may ignore the power commands provided in the I component.

Error handler 224 may further operate when received and expected scrambling mask bits fail to match. Error handler 224, for instance, may filter errors identified by verification information comparator 220. Pursuant to an illustration, error handler 224 may operate upon verification information comparator 220 identifying a mismatch. According to another example, error handler 224 may effectuate further action when at least N errors are identified out of M measurements (e.g., threshold number of errors over time), where N and M may be tunable. Error handler 224 may also enable evaluating each bit of a scrambling mask independently; thus, by way of example, if the scrambling mask includes 16 bits, the first bit (and/or any disparate bit(s)) of the scrambling mask may be evaluated separately from the other 15 bits (e.g., N errors out of M measurements related to the first bit) so that error handler 224 can detect the error condition in which the bits at one particular bit position in the scrambling mask has persistent errors. The error condition may occur if base station 202 uses scrambling mask A and wireless terminal 204 uses scrambling mask B, and scrambling masks A and B differ with each other at that particular bit position.

Error handler 224 may effectuate any type of action in response to identified mismatches between received and expected bits associated with scrambling masks. For example, error handler 224 may facilitate dropping a link between wireless terminal 204 and base station 202; thereafter, wireless terminal 204 may reconnect to base station 202. Pursuant to another illustration, error handler 224 may cause a state transition for wireless terminal 204 from session ON to session HOLD. Accordingly, wireless terminal 204 may silently transition to session HOLD or wireless terminal 204 may initiate a state transition to session HOLD (e.g., by transmitting a state transition request to base station 202). In response to receipt of a state transition request from session ON to session HOLD from wireless terminal 204 already believed to be in session HOLD, base station 202 grants such request to remove the mismatch. Also, although not shown, it is to be appreciated that base station 202 may initiate a state transition for wireless terminal 204.

Figure 3:
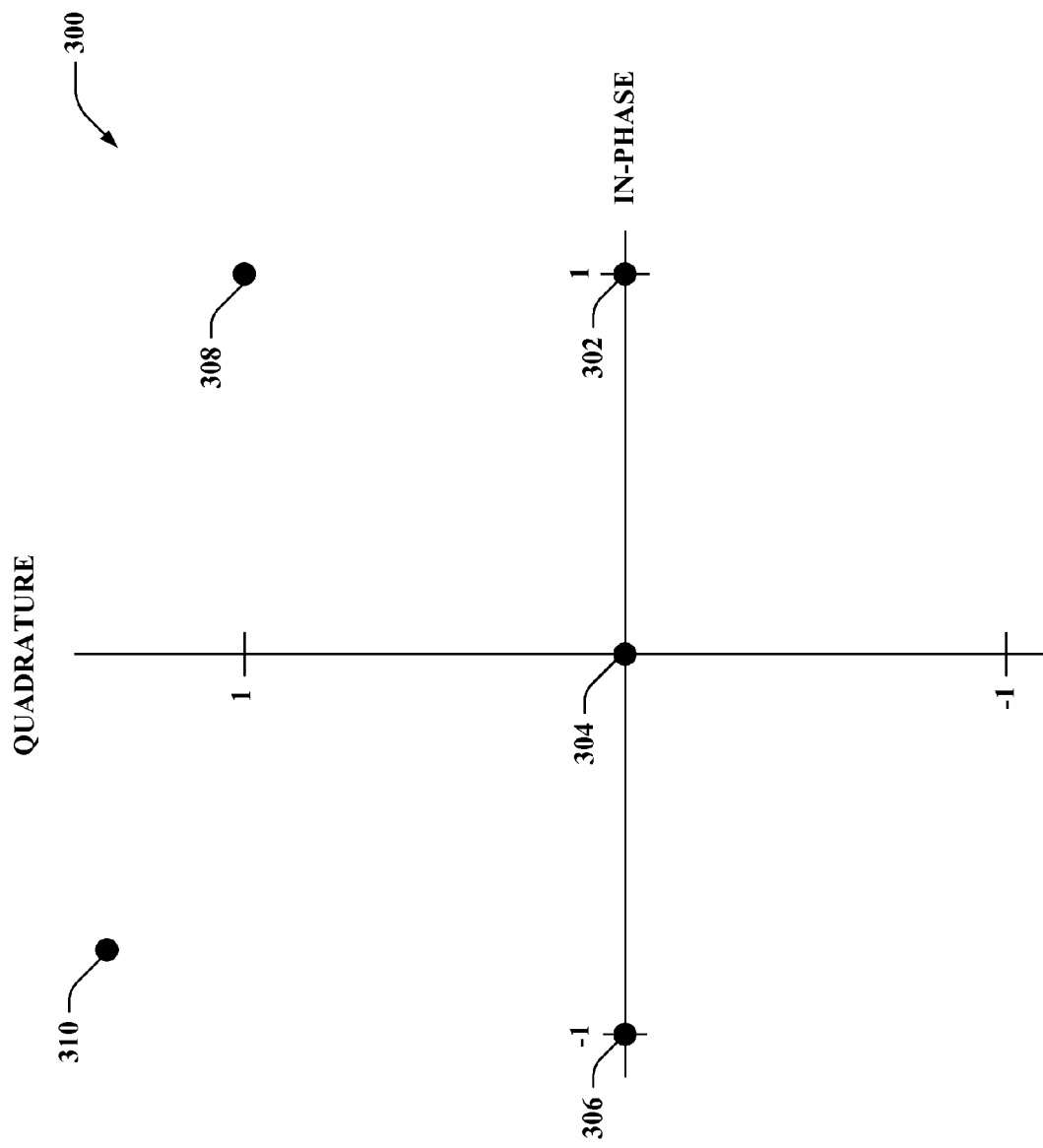
FIG. 3 is an illustration of an exemplary constellation associated with complex symbols that may be received via a downlink power control channel.

Turning to FIG. 3, illustrated is an exemplary constellation 300 associated with complex symbols that may be received via a downlink power control channel. For instance, such received complex symbols may include noise, interference, etc. It is to be appreciated that the claimed subject matter is not limited to the complex symbols described herein and that such symbols are depicted for illustration purposes. The complex symbols include an in-phase (I) component and a quadrature (Q) component. Power commands may be provided in the I component and information associated with a wireless terminal may be included in the Q component. Symbol 302 may be associated with a power command to increase a power level. Symbol 304 may be associated with a power command to remain at a power level. Symbol 306 may be associated with a power command to decrease a power level. Further, symbols 302, 304, and 306 may be transmitted via DLPCCH segments that do not include Q-bit information. Upon receipt of symbols 302, 304, and 306, a wireless terminal may alter its power level. Pursuant to another example, symbol 304 may be transmitted within a DLPCCH segment scheduled to be associated with a Q-bit when a base station believes that no wireless terminal has been assigned to corresponding resources (e.g., SON ID that relates to the DLPCCH segment). Accordingly, if a wireless terminal receives symbol 304 while expecting Q-bit data, the wireless terminal may identify that the base station has reclaimed the allocated resources and therefore the wireless terminal may transition to session HOLD, terminate a connection to base station, etc.

Symbol 308 may be related to a power command to decrease a power level as well as a bit from a scrambling mask included in the Q component. Thus, the verification information may be encoded within the power control information and be utilized as described above. Symbol 310, as shown, has a large amount of energy on the Q axis; thus, symbol 310 may be associated with a large amount of interference and hence may be unreliable (e.g., particularly if no Q component information is expected). Accordingly, the power control command in the I component associated with symbol 310 may be ignored. Pursuant to another illustration, if symbol 310 is determined to be reliable, the I component may be determined to be −1 (e.g., power level adjusted one predetermined increment down) because the value in the I component is less than −½; however, the claimed subject matter is not so limited.

Figure 4:
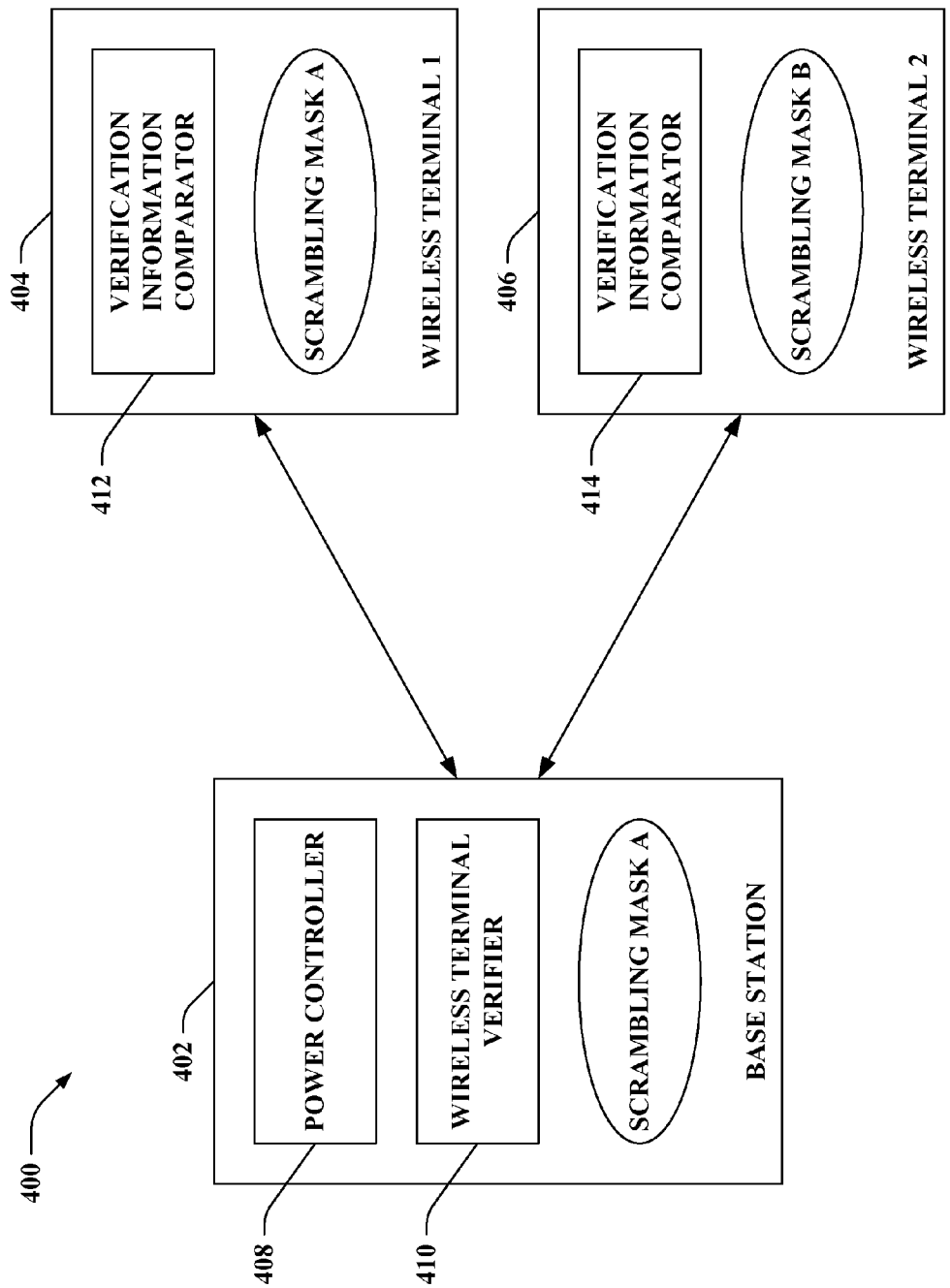
FIG. 4 is an illustration of a system that verifies identities of wireless terminals utilizing downlink power control channel related resources.

Referring now to FIG. 4, illustrated is a system 400 that verifies identities of wireless terminals utilizing downlink power control channel related resources. System 400 includes a base station 402, a wireless terminal 1 404, and a wireless terminal 2 406. Base station 402 may include power controller 408 and wireless terminal verifier 410 as described above. Further, wireless terminal 1 404 and wireless terminal 2 406 may respectively include a verification information comparator 412 and a verification information comparator 414 similar to the above description. Additionally, wireless terminal 1 404 may be associated with scrambling mask A and wireless terminal 2 406 may be associated with scrambling mask B, with A and B being different.

According to an example, wireless terminal 1 404 and wireless terminal 2 406 may simultaneously decode the same DLPCCH segments. Both wireless terminal 1 404 and wireless terminal 2 406 may believe they have the same SON ID (e.g., both decoding DLPCCH segments associated with the same SON ID). For instance, one of the wireless terminals may have erroneously determined an associated SON ID, failed to obtain a base station transition request from session ON to session HOLD, incorrectly decoded a base station command to transition to session ON state, or the like. Base station 402 may transmit power commands in the I component of a complex symbol by employing power controller 408 and verification information related to a proper wireless terminal in the Q component of the complex symbol via utilizing wireless terminal verifier 410. Assuming that wireless terminal 1 404 is properly utilizing the SON ID and associated resources, wireless terminal verifier 410 may transmit one bit of scrambling mask A in Q components associated with disparate DLPCCH segments. Thus, verification information comparators 412 and 414 may compare the received information in the Q component to scrambling masks uniquely assigned to each of the wireless terminals to determine whether the resources are properly being utilized. Pursuant to this illustration, wireless terminal 1 404 may determine that the received and expected scrambling mask bits match and therefore continue utilizing the received power commands. Further, wireless terminal 2 406 may determine that there is a mismatch between the received and expected scrambling mask bits due to bits associated with scrambling mask A being transmitted, yet scrambling mask B being assigned to wireless terminal 2 406; thereafter, wireless terminal 2 406 may discontinue the connection with base station 402, transition to session HOLD, etc. It is to be appreciated that scrambling mask A and scrambling mask B may have any number of similar and/or differing bits.

Consider an exemplary OFDM system in which the radio resource comprises a sequence of OFDM symbols, one after another. An OFDM symbol comprises a number of tones, also known as subcarriers. In a given OFDM symbol, each tone, referred to as a tone-symbol, can be used to transmit a complex number, which carries certain information. For example, the number of tones can be 113.

Moreover, consider an embodiment of a signal structure of the sequence of OFDM symbols. Specifically, the sequence of OFDM symbols is divided into ultraslots. Each ultraslot includes 18 beaconslots with indices 0 through 17, and each beaconslot includes eight superslots with indices 0 through 7. For the downlink, each superslot includes a header (H) followed by 16 halfslots with indices 0 through 15. The superslot header spans two symbol periods, each halfslot spans 7 symbol periods, and each superslot spans 114 symbol periods. A halfslot within a superslot can be indexed, in an ascending order, as 0, 1, . . . , 15. The index variable is denoted as dlSuperslotHalfslotIndex. A base station may transmit traffic data, signaling, and/or pilot in each symbol period of each slot. Each OFDM symbol within an ultraslot can be indexed, in an ascending order, as 0, 1, . . . , 16415. The index variable is denoted as dlUltraslotOFDMSymbolIndex.

Figure 5:
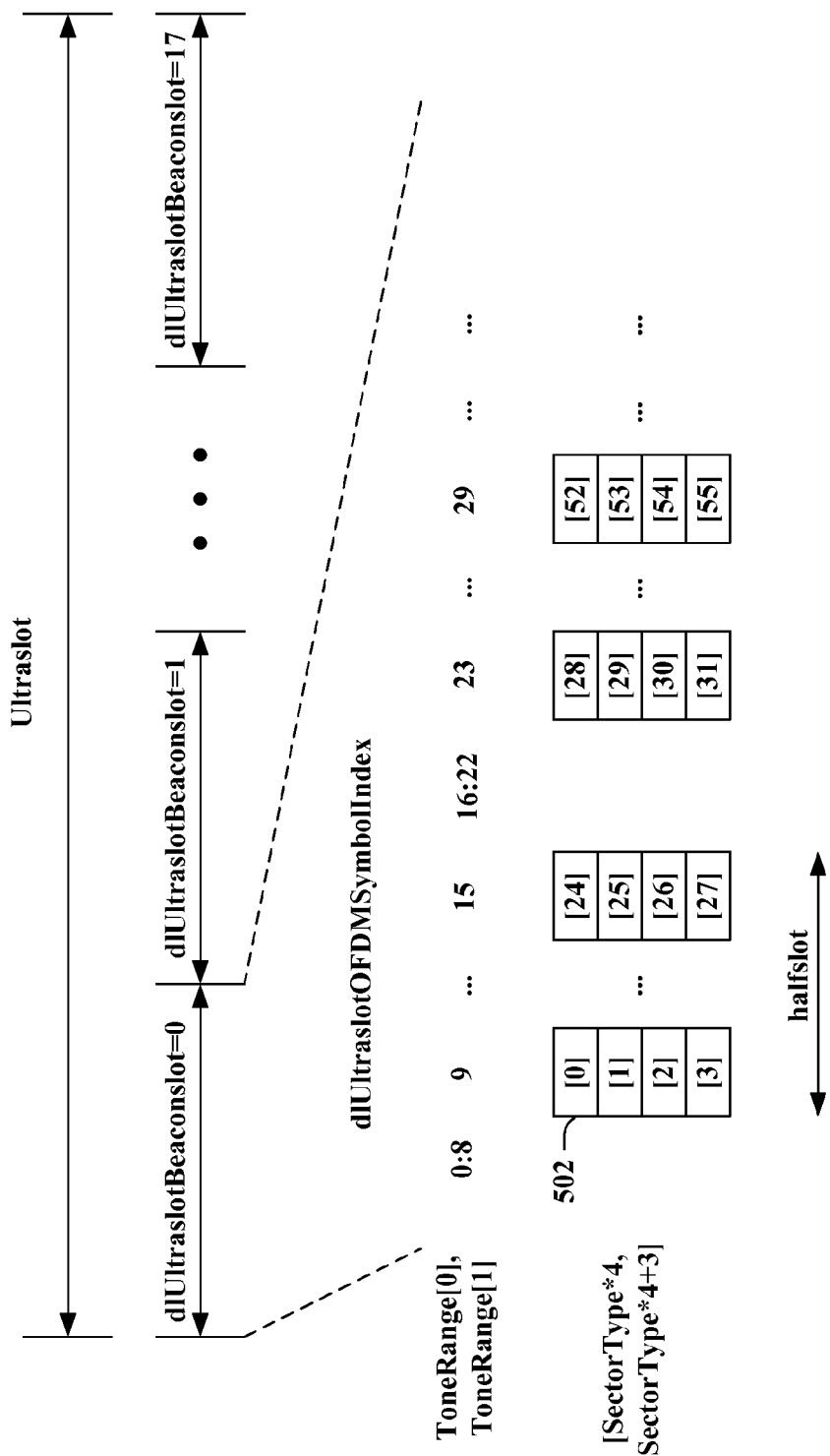
FIG. 5 is an exemplary illustration of downlink power control channel (DL.PCCH) segments.

With reference to FIG. 5, depicted is an exemplary illustration of downlink power control channel (DL.PCCH) segments (e.g., segment 502, etc.). The DL.PCCH channel may be utilized to transmit downlink (DL) power control messages to control wireless terminal (WT) transmission power. In a given base station sector, the DL.PCCH channel may include 4 tones in 7 halfslots. The 4 tones are contiguous in the logical domain. That is, in a hopping system, the set of the 4 tones may be mapped to another set of 4 tones, which may be potentially noncontiguous. The values of dlSuperslotHalfslotIndex of the 7 halfslots are equal to 2*k+1, for k=0:7 except for k=k0 with k0 being a system parameter, in any superslot. A DL.PCCH channel segment (e.g., segment 502) may include one tone-symbol. In an ultraslot, there are 28224 DL.PCCH segments. For s=0:28223, the DL.PCCH channel segment [s] may be defined as follows. In an ultraslot, the DL.PCCH segments may be indexed primarily in the ascending order of the dlUltraslotOFDMSymbolIndex, and secondarily in the ascending order of logical tone index for those of the same dlUltraslotOFDMSymbolIndex (e.g., in the same OFDM symbol). In particular, the tone-symbol of tone index equal to 0 in the first OFDM-symbol in the first halfslot may be used as DL.PCCH segment [0], the tone-symbols of tone indices equal to 1 to 3 in the same OFDM-symbol may be used respectively as DL.PCCH segments [1], [2], [3]. Then, the tone-symbols of tone indices equal to 0 to 3 in the second OFDM-symbol of the same halfslot may be used respectively as DL.PCCH segments [4], [5], [6], [7], and so on. Hence, 1568 DL.PCCH segments may be included in each beaconslot. There may be 196 DL.PCCH segments in each superslot out of a beaconslot. In a superslot, the DL.PCCH segments may be in 7 halfslots. There may be 28 DL.PCCH segments in one of the halfslots.

When a wireless terminal is connected with the base station (sector), in particular when the wireless terminal is in the ON state for the connection, a subset of the DL.PCCH segments are assigned to the wireless terminal. In the ON state, the wireless terminal is assigned an ON identifier, denoted as wtOnID, as well as other ON identifiers such as wtONMASK. In various embodiments, the subset of DL.PCCH segments assigned to the wireless terminal is determined by the ON identifiers of the wireless terminal.

There are two implications. First, different wireless terminals use disjoint subsets of the DL.PCCH segments, because they are assigned with different ON identifiers. Second, after an ON identifier has been relinquished, e.g., because the previously assigned wireless terminal exits the ON state, it is desired that the base station assigns the ON identifier to another wireless terminal to reduce the idle time of the ON identifier so as to increase the utilization of the DL.PCCH segments. However, such a fast switch may lead to robustness issues. For example, the base station may think the first terminal has relinquished the ON identifier but the first terminal may think it still has the ON identifier, e.g., because of signaling errors. Then both terminals think they have the ON identifier, which is a detrimental state disconnect condition that has to be resolved.

To resolve the robustness issues, in an embodiment, a terminal is assigned an identifier used to uniquely identify the terminal. This identifier may be a scrambling mask, a MAC ID, an Internet Protocol (IP) address, or some other type of ID. In an embodiment that is described in detail below, the terminal identifier is given by a scrambling mask that is denoted as wtScramblingMask. In general, the scrambling masks assigned to the terminals may be unique for a single base station, a set of base stations, or the entire system depending on how the scrambling masks are assigned.

Unlike the ON identifier, the terminal identifier may not be related to the use or allocation of radio resource. Therefore, the terminal identifier is not a precious resource in the sense that the terminal identifier can have a relatively larger length. In an embodiment, each terminal has a static terminal identifier, which does not change when the terminal moves from one base station to another. In another embodiment, a terminal is dynamically assigned a terminal identifier when it is connected with a base station. In that case, the base station does not have to aggressively increase the utilization of a given terminal identifier. For example, after a first terminal relinquishes a terminal identifier, the base station may keep the terminal identifier unused for some period of time, e.g., a minute, to make sure that the first terminal has indeed relinquished the terminal identifier, before the same terminal identifier is assigned to a second terminal. Thus, the probability that two terminals both think they have the same terminal identifier is minimized.

In accordance with various aspects, the information related to the terminal identifier is sent together with the regular power control commands in the subset of the DL.PCCH segments assigned to the ON identifier of a given wireless terminal.

The DL.PCCH segment may be directed to a particular WT that maps to assigned resources (e.g., wtOnID, wtONMASK). Each DL.PCCH segment may carry two pieces of information, namely the I and the Q components (in-phase component and quadrature component respectively), which may be determined as follows. The I component may include the DL power control message, which directs the WT to adjust its transmission power. The I component may be set to −1 (or 1) if the base station subsystem (BSS) commands the WT to decrease (or increase) its transmission power. The I component may be set to 0 if the BSS commands the WT to keep its transmission power unchanged. The Q component may be set to 0 except for the following case: if the WT to which the DL.PCCH is directed is valid (e.g., the ON identifier associated with the DL.PCCH segment is currently being used by a wireless terminal), then the Q component may be set to either 1 or −1, e.g., as a function of the terminal identifier of the wireless terminal that is assigned with the corresponding ON identifier. In an embodiment, only a predetermined subset of the DL.PCCH segments associated with a given ON identifier are to set the Q component to either 1 or −1. Denote s the index of the DL.PCCH segments, so s=0, . . . , 28223. In an embodiment, the Q component may be set to 1 or −1 when mod(s,8) is equal to 0, in which case up to only ⅛ of the DL.PCCH segments may send non-zero Q components; however, the claimed subject matter is not so limited. If the WT is absent for a given ON identifier, then the Q component may be set to 0 for all the DL.PCCH segments.

The value of the Q component (e.g., 1, −1) when the WT is present may be determined based upon a sequence associated with the terminal identifier, e.g., a scrambling mask, unique to each WT. For example, $Z_k$ may be the k-th bit in a binary expression of the scrambling mask (e.g., wtScramblingMask) of the WT, where k=0:15 and $Z_{15}$ is the most significant bit (MSb) and $Z_0$ is the least significant bit (LSb). To continue the above embodiment of using ⅛ of the DL.PCCH segments for non-zero Q components in which the DL.PCCH segment [s] may have the Q component set to either 1 or −1 when mod(s, 8) is equal to 0, define variable X=mod(15−floor(s/8/D),16) and the Q component of the DL.PCCH segment [s] depends on a particular bit of the scrambling mask: the Q component may be set to 1 if $Z_x$ is equal to 0, and set to −1 if $Z_x$ is equal to 1. Here, D is a system parameter, for example, D=31 or 93.

The BSS may set the coded modulation-symbol to be (I, Q), where I and Q are the values of the I and Q components respectively. Further, the BSS may carry out a hopping mapping operation to modulate the complex symbol (I,Q) to the designated frequency tone in a given OFDM symbol according to some hopping mapping function.

When the WT is in the ON state, the following operation associated with power control may be employed. The BSS may transmit the DL power control message to the WT in the subset of the DL.PCCH segments assigned to the ON identifier of the WT. The WT may receive those DL.PCCH segments to get power control messages, and adjust its transmission power based on the received DL power control message.

The WT may receive the power control message from the I component of the DL.PCCH segment. The BSS may also measure the signal quality of the UL signal received from the WT, such as the uplink dedicated control channel (UL.DCCH) channel, and determine the power control message to ensure the signal quality meets the target.

The WT may also receive the Q component of the DL.PCCH segment. If the WT detects that the received Q component contains a large amount of energy in the DL.PCCH segment of which the Q component is supposed to be set to 0, then the WT may consider the DL.PCCH segment unreliable and discard the I component as well.

The Q component may also be used for status validation. If, during status validation, the received Q component does not match the scrambling mask (e.g., wtScramblingMask) of the WT, then the I component may be interpreted as a command to decrease the transmission power of the WT.

Status validation may also be carried out when the WT is in the ON state. When a DL.PCCH segment is to be sent, the BSS may determine the Q component of the DL.PCCH segment. The WT may receive the Q component of the DL.PCCH segments dedicated to the WT, and compare the received value of the Q component with the corresponding bit of its wtScramblingMask. If the two match, a matching indicator may be set to X=0; otherwise if the received value of the Q component does not match, the matching indicator may be set to X=1. The matching indicator X is used to measure how the received Q components match the wtScramblingMask of the WT as follows.

The WT may maintain an internal variable Y. When the WT enters the ON state, the WT may set Y=0. After the WT determines a new X, the WT may update Y using a first-order lowpass filter as follow: Y=alpha*X+(1−alpha)*Y, where parameter alpha is set to ⅛192. The WT may then compare the new Y with a threshold parameter $T=1-(1-alpha)^m$, where m=(onDropTimer/11.4)*(196/248). Parameter onDropTimer is a number measured in milliseconds and passed on to the WT in an upper layer protocol. If the new Y does not exceed threshold T, then the WT may refrain from taking any further action. Otherwise, the WT may silently give up its wtActiveID, wtOnID, wtOnMask and migrate to the NULL state with the BSS. The WT may thereafter migrate to the ACCESS state with the BSS again.

Figure 6:
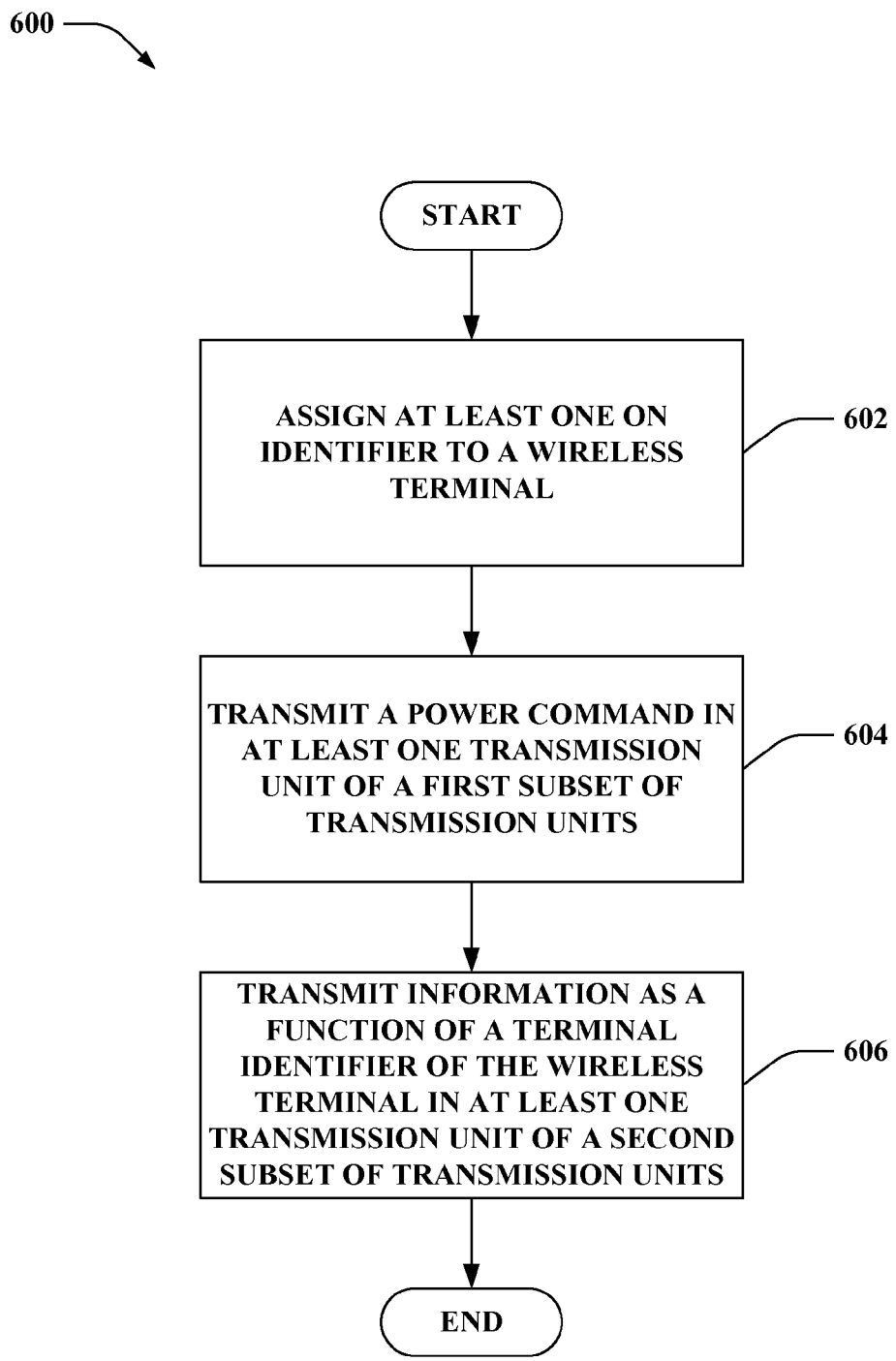
FIG. 6 is an illustration of a methodology that facilitates controlling transmission power of a wireless terminal.
Figure 7:
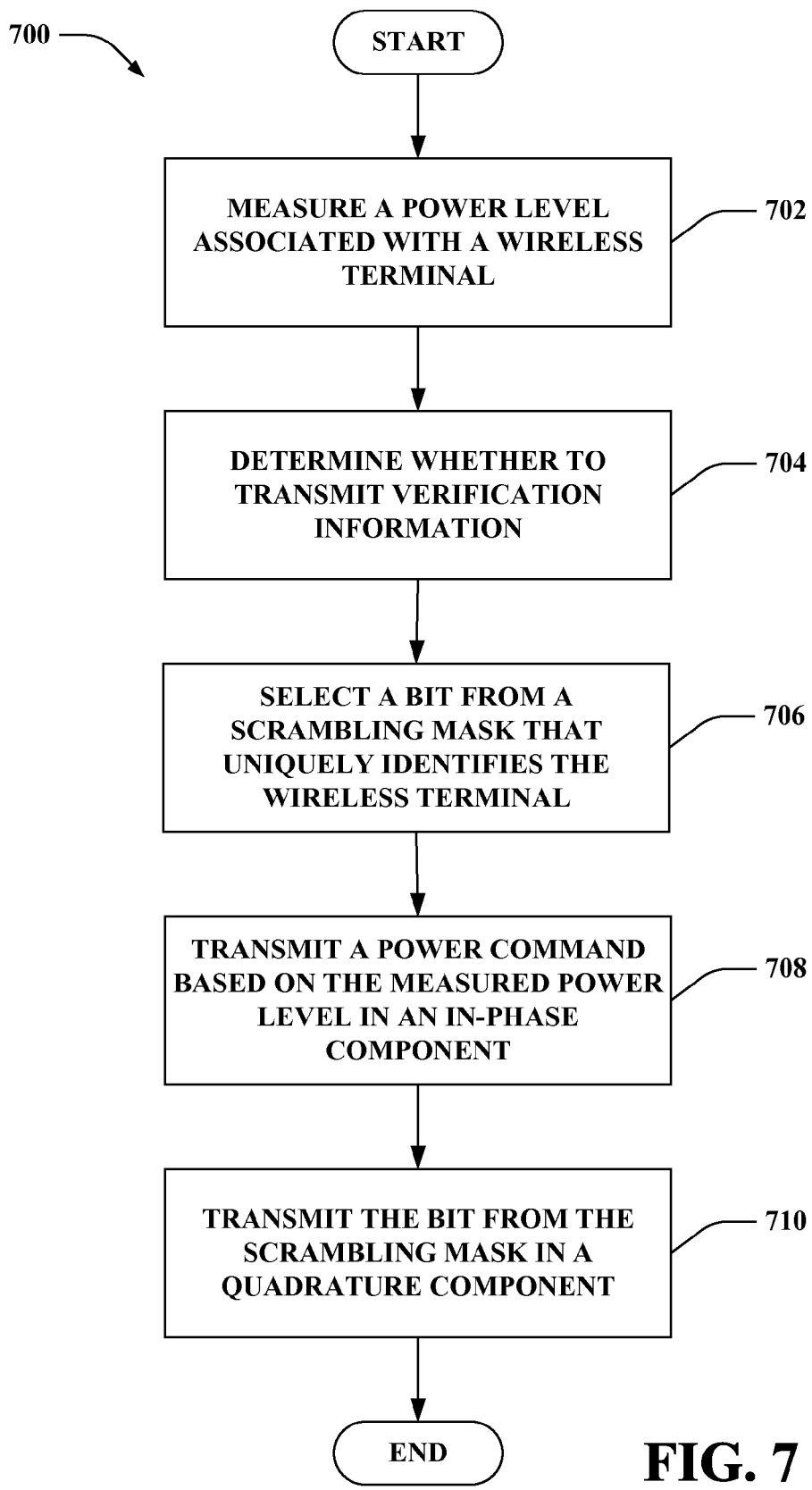
FIG. 7 is an illustration of a methodology that facilitates selecting data to be incorporated in a symbol transmitted via utilizing downlink power control channel resources.
Figure 8:
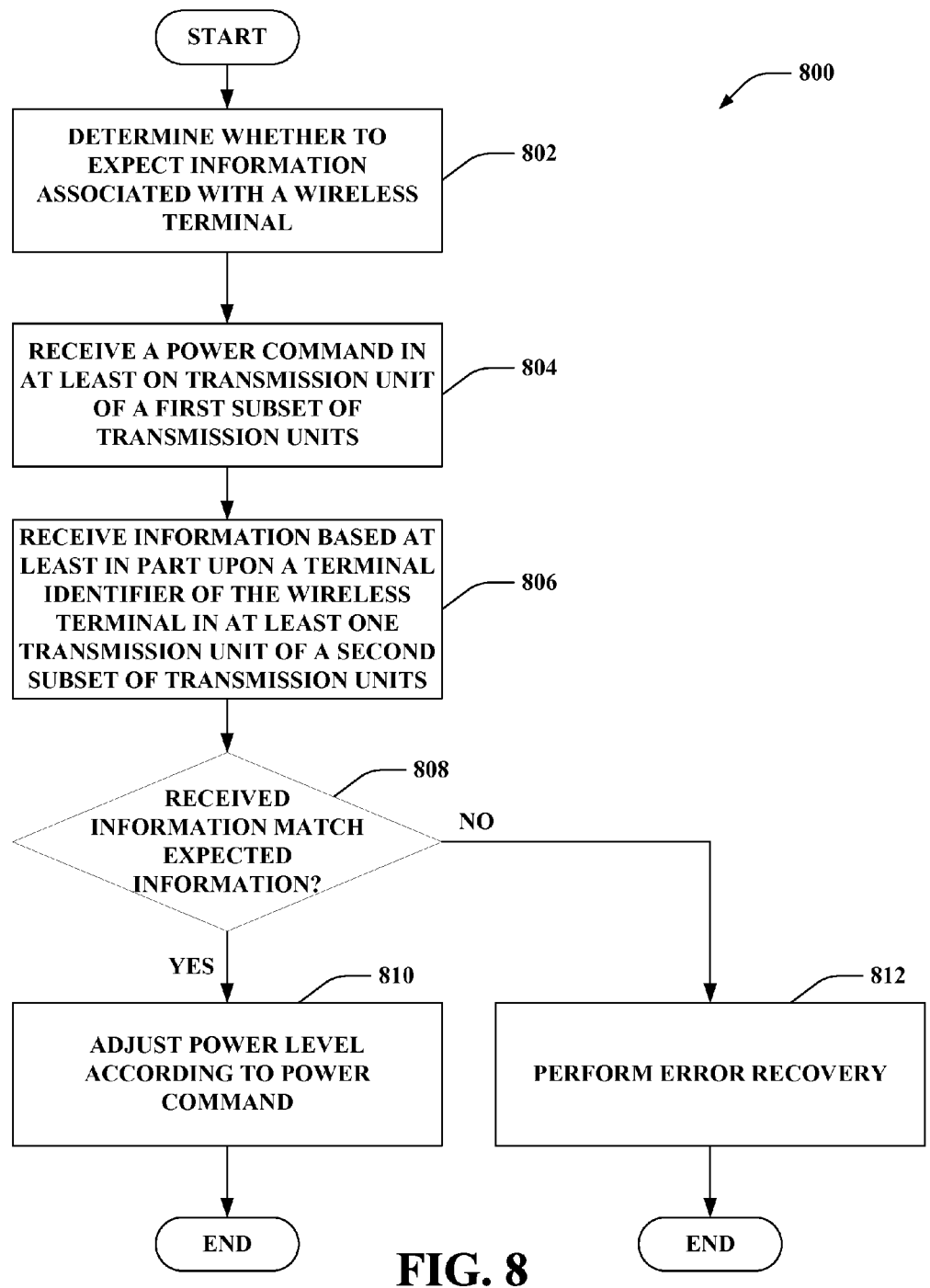
FIG. 8 is an illustration of a methodology that facilitates evaluating wireless terminal specific power control information provided via a downlink power control channel.

Referring to FIGS. 6-8, methodologies relating to including wireless terminal specific information in a Q component of a complex symbol transmitted via a downlink power control channel segment to enable wireless terminal verification are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

With reference to FIG. 6, illustrated is a methodology 600 that facilitates controlling transmission power and detecting state disconnect of a wireless terminal. At 602, at least one ON identifier may be assigned to the wireless terminal. For instance, the ON identifier may be associated with a first predetermined subset of transmission units and a second predetermined subset of transmission units. It is to be appreciated that the first predetermined subset may include the second predetermined subset. Further, the first predetermined subset may include N times as many transmission units as the second predetermined subset, where N may be any integer (e.g., eight). At 604, a power command may be transmitted in at least one transmission unit of the first subset of transmission units. The power command may be a signal to increase a power level, decrease a power level, remain at a power level, etc. Further, the power command to transmit may be determined based upon an evaluation of a measured power level associated with the wireless terminal. Accordingly, a wireless terminal specific power command may be included in a first component of the transmission unit. The first component, for example, may be one of an in-phase (I) component and a quadrature (Q) component. Downlink power control channel segments may comprise an OFDM tone-symbol carrying a modulation symbol value, wherein the power command may be included in connection with the I component of the symbol value.

At 606, information as a function of a terminal identifier associated with the wireless terminal may be transmitted in a transmission unit of the second subset of transmission units. The information may include a portion of the terminal identifier (e.g., scrambling mask) associated with the wireless terminal. For example, the scrambling mask may uniquely correspond to the wireless terminal, and thus, facilitate verifying an identity of the wireless terminal. According to another illustration, the information may be included in a second component (e.g., a quadrature (Q) component, an in-phase (I) component). Pursuant to an illustration, one bit of the scrambling mask may be inserted in the Q component of a symbol for transmission via the downlink power control channel. Further, the information associated with the wireless terminal may be transmitted with a subset of the transmissions of the power commands (e.g., one out of N power command transmissions may be associated with a transmission of information associated with a wireless terminal, where N may be any integer).

Turning to FIG. 7, illustrated is a methodology 700 that facilitates selecting data to be incorporated in a symbol transmitted via utilizing downlink power control channel resources. At 702, a power level associated with a wireless terminal may be measured. For instance, the wireless terminal may transmit periodically on an uplink channel such as a dedicated control channel (DCCH), which may be measured. Further, similar measurements may be made for any number of wireless terminals within a system associated with a base station sector. At 704, a determination is made as to whether to transmit verification information in a particular transmission unit. For example, if a particular transmission unit is included within a subset of transmission units associated with an ON identifier allocated to a wireless terminal, method 700 may continue to 706. At 706, a bit from a terminal identifier (e.g., a scrambling mask) that uniquely identifies the wireless terminal may be selected. By utilizing the bits from the scrambling mask, verification information may be encoded with user specific power control information to mitigate mismatches between wireless terminal(s) and base station(s). Selection of the bit from the scrambling mask may be based upon an index value (k) that identifies a bit position (kth bit position) within the scrambling mask. The value ($Z_k$) of the kth bit of the scrambling mask assigned to the wireless terminal may be selected. For instance, the bit position within the scrambling mask may be a function of a particular transmission unit.

At 708, a power command based on the measured power level may be transmitted in an in-phase component. The power command may be transmitted during a downlink power control segment associated with a resource assigned to the measured wireless terminal to which the power command relates. At 710, the bit from the scrambling mask may be transmitted in a quadrature component. Thus, further verification information may be provided along with the power command to facilitate providing power command information to wireless terminals to which such information is intended.

Referring now to FIG. 8, illustrated is a methodology 800 that facilitates evaluating wireless terminal specific power control information provided via a downlink power control channel. At 802, a determination may be effectuated concerning whether information associated with a wireless terminal is expected to be obtained. For example, an ON identifier may be received and/or evaluated, and the ON identifier may be associated with a first predetermined subset of transmission units and a second predetermined subset of transmission units. If such information is expected, method 800 continues to 804. At 804, a power command may be received in at least one transmission unit of the first subset of transmission units. For instance, the power command may be received in a first component. The first component may be, for instance, an in-phase (I) component (and/or a quadrature (Q) component). At 806, information based at least in part upon a terminal identifier of a wireless terminal may be received in at least one transmission unit of the second subset of transmission units. For instance, the information may be obtained in a second component. For example, the second component may be a quadrature (Q) component (and/or an in-phase (I) component). Thus, the information associated with the wireless terminal may be obtained in a Q component of the received modulation symbol. Further, the information associated with the wireless terminal may be a portion of a scrambling mask associated with the wireless terminal.

At 808, a determination may be made as to whether the received information associated with the wireless terminal matches expected information. Each received value may be compared with a corresponding expected value. Thus, a portion of a scrambling mask included in the second component may be evaluated with a portion of a scrambling mask retained by a wireless terminal. Further, the determination may consider a threshold number of differences over time. For example, if N comparisons of expected and received values differ out of M measurements, where N and M may be any integer values (and may be dynamically adjusted), then the received information may be considered to not match the expected information. According to another illustration, each bit of a scrambling mask may be independently evaluated; thus, a first bit of the expected scrambling mask may be compared with received information corresponding to the first bit (e.g., such information may be periodically obtained). By analyzing each scrambling mask bit individually, if one bit is determined to not match with a sufficient level of certainty, then it is determined that the received information does not match the expected information.

If the received information is determined to match the expected information, methodology 800 continues to 810. At 810, a power level may be adjusted according to the power level command. Thus, the power level may be increased, decreased, or may continue to remain at a level. If the received information is determined to not match the expected information at 808, methodology 800 continues at 812. At 812, error recovery may be performed. For instance, the wireless terminal may discontinue a connection with the base station. Additionally or alternatively, the wireless terminal may transition from a session ON state to a session HOLD state. It is to be appreciated that such transition may be base station and/or wireless terminal initiated.

It will be appreciated that, in accordance with one or more aspects described herein, inferences can be made regarding including and/or evaluating wireless terminal related information encoded with power command information utilized with downlink power control channel resources. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or more methods presented above can include making inferences regarding selecting when or how often to include information associated with a wireless terminal in a Q component. By way of further illustration, an inference may be made as to whether information in a Q component matches expected information. Further, inference may be made pertaining to whether a received symbol is unreliable as evinced by a large amount of energy on a Q axis and thus should be ignored. It will be appreciated that the foregoing examples are illustrative in nature and are not intended to limit the number of inferences that can be made or the manner in which such inferences are made in conjunction with the various embodiments and/or methods described herein.

Figure 9:
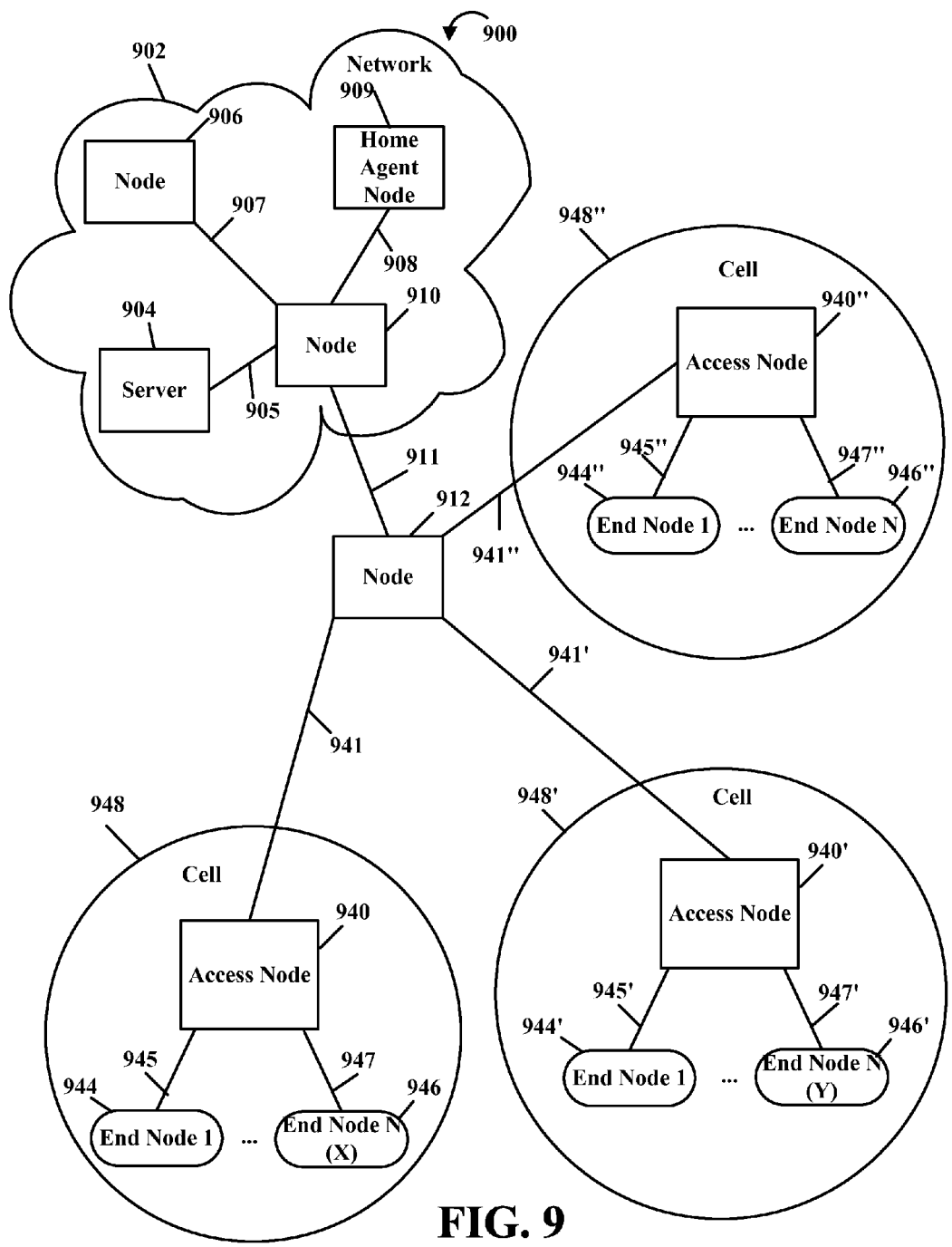
FIG. 9 is an illustration of an exemplary communication system (e.g., a cellular communication network) implemented in accordance with various aspects.

With reference to FIG. 9, illustrated is an exemplary communication system 900 (e.g., a cellular communication network) implemented in accordance with various aspects, which comprises a plurality of nodes interconnected by communications links. Nodes in exemplary communication system 900 exchange information using signals (e.g., messages) based on communication protocols (e.g., the Internet Protocol (IP)). The communications links of system 900 may be implemented, for example, using wires, fiber optic cables, and/or wireless communications techniques. Exemplary communication system 900 includes a plurality of end nodes 944, 946, 944', 946', 944", 946", which access communication system 900 via a plurality of access nodes 940, 940', and 940". End nodes 944, 946, 944', 946', 944", 946" may be, e.g., wireless communication devices or terminals, and access nodes 940, 940', 940" may be, e.g., wireless access routers or base stations. Exemplary communication system 900 also includes a number of other nodes 904, 906, 909, 910, and 912, used to provide interconnectivity or to provide specific services or functions. Specifically, exemplary communication system 900 includes a Server 904 used to support transfer and storage of state pertaining to end nodes. The Server node 904 may be an AAA server, a Context Transfer Server, a server including both AAA server functionality and Context Transfer server functionality.

Exemplary communication system 900 depicts a network 902 that includes Server 904, node 906 and a home agent node 909, which are connected to an intermediate network node 910 by corresponding network links 905, 907 and 908, respectively. Intermediate network node 910 in network 902 also provides interconnectivity to network nodes that are external from the perspective of network 902 via network link 911. Network link 911 is connected to another intermediate network node 912, which provides further connectivity to a plurality of access nodes 940, 940', 940" via network links 941, 941', 941", respectively.

Each access node 940, 940', 940" is depicted as providing connectivity to a plurality of N end nodes (944, 946), (944', 946'), (944", 946"), respectively, via corresponding access links (945, 947), (945', 947'), (945", 947"), respectively. In exemplary communication system 900, each access node 940, 940', 940" is depicted as using wireless technology (e.g., wireless access links) to provide access. A radio coverage area (e.g., communications cells 948, 948', and 948") of each access node 940, 940', 940", respectively, is illustrated as a circle surrounding the corresponding access node.

Exemplary communication system 900 is presented as a basis for the description of various aspects set forth herein. Further, various disparate network topologies are intended to fall within the scope of the claimed subject matter, where the number and type of network nodes, the number and type of access nodes, the number and type of end nodes, the number and type of Servers and other Agents, the number and type of links, and the interconnectivity between nodes may differ from that of exemplary communication system 900 depicted in FIG. 9. Additionally, functional entities depicted in exemplary communication system 100 may be omitted or combined. Also, the location or placement of the functional entities in the network may be varied.

Figure 10:
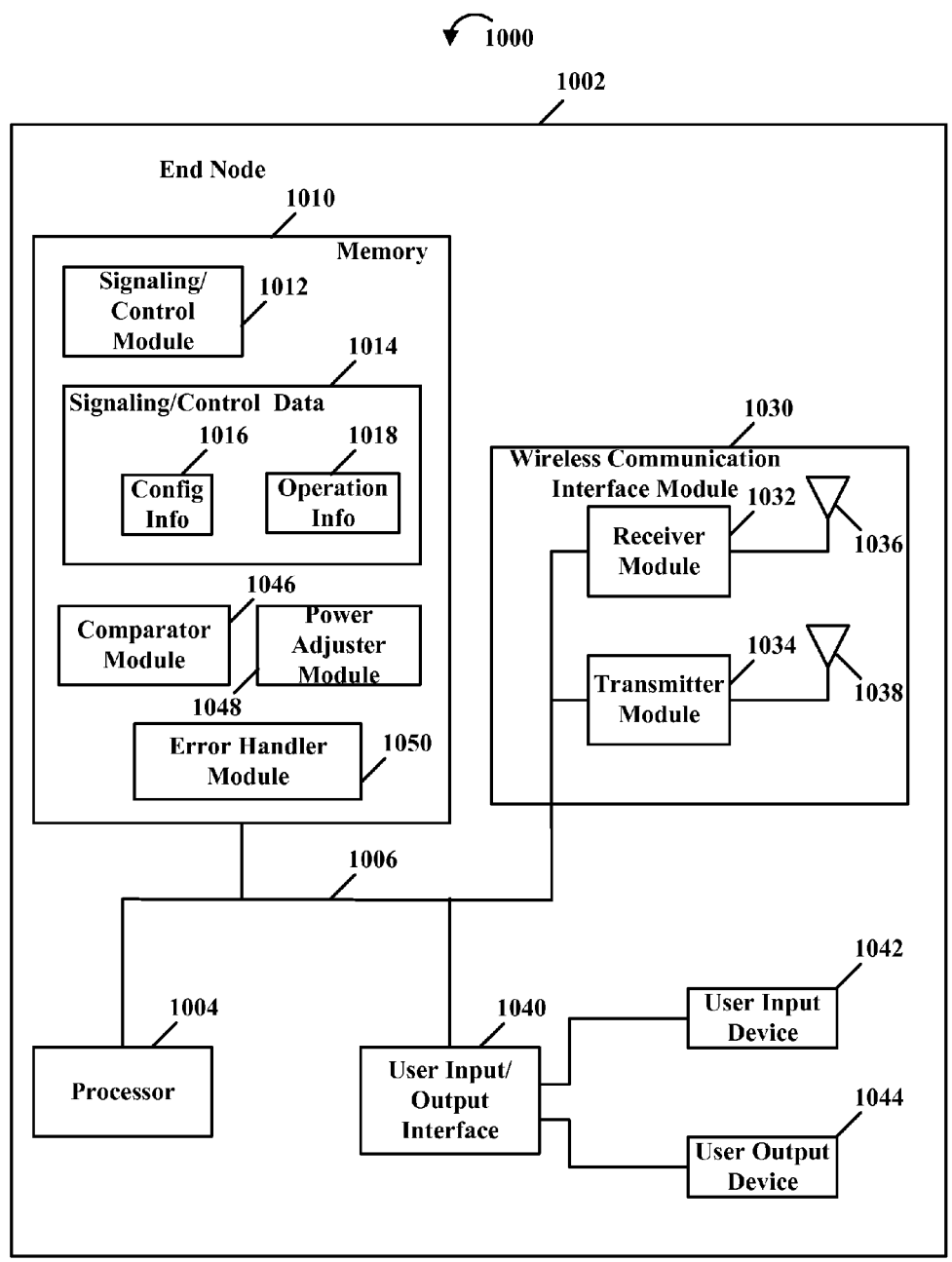
FIG. 10 is an illustration of an exemplary end node (e.g., a mobile node) associated with various aspects.

FIG. 10 illustrates an exemplary end node 1000 (e.g., a mobile node, a wireless terminal) associated with various aspects. Exemplary end node 1000 may be an apparatus that may be used as any one of the end nodes 944, 946, 944', 946', 944", 946" depicted in FIG. 9. As depicted, end node 1000 includes a processor 1004, a wireless communication interface 1030, a user input/output interface 1040 and memory 1010 coupled together by a bus 1006. Accordingly, various components of end node 1000 can exchange information, signals and data via bus 1006. Components 1004, 1006, 1010, 1030, 1040 of end node 1000 may be located inside a housing 1002.

Wireless communication interface 1030 provides a mechanism by which the internal components of the end node 1000 can send and receive signals to/from external devices and network nodes (e.g., access nodes). Wireless communication interface 1030 includes, for example, a receiver module 1032 with a corresponding receiving antenna 1036 and a transmitter module 1034 with a corresponding transmitting antenna 1038 used for coupling end node 1000 to other network nodes (e.g., via wireless communications channels).

Exemplary end node 1000 also includes a user input device 1042 (e.g., keypad) and a user output device 1044 (e.g., display), which are coupled to bus 1006 via user input/output interface 1040. Thus, user input device 1042 and user output device 1044 can exchange information, signals and data with other components of end node 1000 via user input/output interface 1040 and bus 1006. User input/output interface 1040 and associated devices (e.g., user input device 1042, user output device 1044) provide a mechanism by which a user can operate end node 1000 to accomplish various tasks. In particular, user input device 1042 and user output device 1044 provide functionality that allows a user to control end node 1000 and applications (e.g., modules, programs, routines, functions, etc.) that execute in memory 1010 of end node 1000.

Processor 1004 may be under control of various modules (e.g., routines) included in memory 1010 and may control operation of end node 1000 to perform various signaling and processing as described herein. The modules included in memory 1010 are executed on startup or as called by other modules. Modules may exchange data, information, and signals when executed. Modules may also share data and information when executed. Memory 1010 of end node 1000 may include a signaling/control module 1012 and signaling/control data 1014.

Signaling/control module 1012 controls processing relating to receiving and sending signals (e.g., messages) for management of state information storage, retrieval, and processing. Signaling/control data 1014 includes state information such as, for instance, parameters, status, and/or other information relating to operation of the end node. In particular, signaling/control data 1014 may include configuration information 1016 (e.g., end node identification information) and operational information 1018 (e.g., information about current processing state, status of pending responses, etc.). Signaling/control module 1012 may access and/or modify signaling/control data 1014 (e.g., update configuration information 1016 and/or operational information 1018).

Memory 1010 of end node 1000 may also include a comparator module 1046, a power adjuster module 1048, and/or an error handler module 1050. Although not depicted, it is to be appreciated that comparator module 1046, power adjuster module 1048, and/or error handler module 1050 may store and/or retrieve data associated therewith that may be stored in memory 1010. Comparator module 1046 may evaluate received information associated with end node 1000 and effectuate a comparison with expected information. Further, comparator module 1046 may be similar to verification information comparator 220 of FIG. 2. Power adjuster module 1048 may effectuate modifying a power level associated with end node 1000 and may be similar to power adjuster 222 of FIG. 2. Error handler module 1050 may enable responding to an identified error condition identified via employing comparator module 1046 and may be similar to error handler 224 of FIG. 2.

Figure 11:
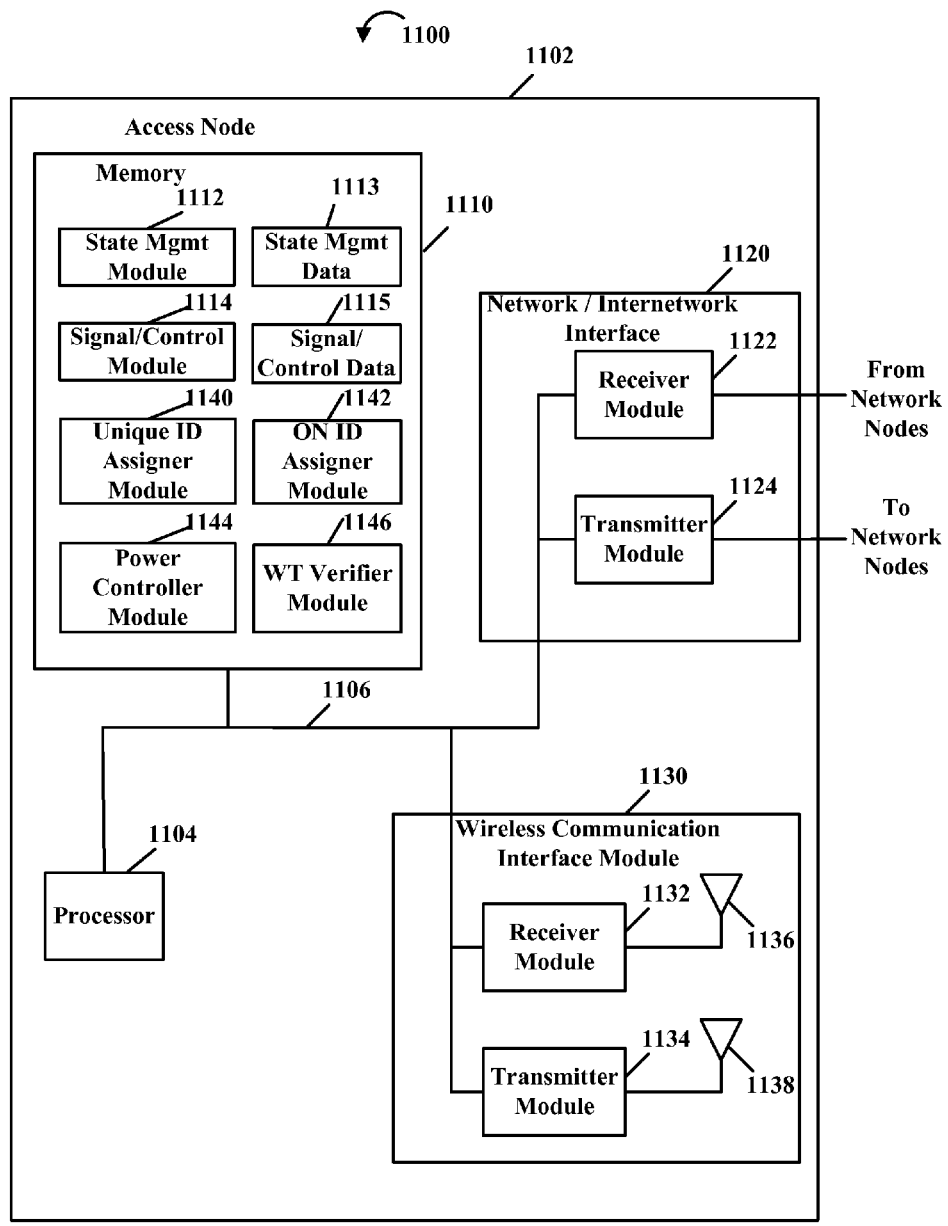
FIG. 11 is an illustration of an exemplary access node implemented in accordance with various aspects described herein.

FIG. 11 provides an illustration of an exemplary access node 1100 implemented in accordance with various aspects described herein. Exemplary access node 1100 may be an apparatus utilized as any one of access nodes 940, 940', 940" depicted in FIG. 9. Access node 1100 includes a processor 1104, memory 1110, a network/internetwork interface 1120 and a wireless communication interface 1130, coupled together by a bus 1106. Accordingly, various components of access node 1100 can exchange information, signals and data via bus 1106. The components 1104, 1106, 1110, 1120, 1130 of the access node 1100 may be located inside a housing 1102.

Network/internetwork interface 1120 provides a mechanism by which the internal components of access node 1100 can send and receive signals to/from external devices and network nodes. Network/internetwork interface 1120 includes a receiver module 1122 and a transmitter module 1124 used for coupling access node 1100 to other network nodes (e.g., via copper wires or fiber optic lines). Wireless communication interface 1130 also provides a mechanism by which the internal components of access node 1100 can send and receive signals to/from external devices and network nodes (e.g., end nodes). Wireless communication interface 1130 includes, for instance, a receiver module 1132 with a corresponding receiving antenna 1136 and a transmitter module 1134 with a corresponding transmitting antenna 1138. Wireless communication interface 1130 may be used for coupling access node 1100 to other network nodes (e.g., via wireless communication channels).

Processor 1104 under control of various modules (e.g., routines) included in memory 1110 controls operation of access node 1100 to perform various signaling and processing. The modules included in memory 1110 may be executed on startup or as called by other modules that may be present in memory 1110. Modules may exchange data, information, and signals when executed. Modules may also share data and information when executed. By way of example, memory 1110 of access node 1100 may include a State Management module 1112 and a Signaling/Control module 1114. Corresponding to each of these modules, memory 1110 also includes State Management data 1113 and the Signaling/Control data 1115.

State Management Module 1112 controls the processing of received signals from end nodes or other network nodes regarding state storage and retrieval. State Management Data 1113 includes, for instance, end-node related information such as the state or part of the state, or the location of the current end node state if stored in some other network node. State Management module 1112 may access and/or modify State Management data 1113.

Signaling/Control module 1114 controls the processing of signals to/from end nodes over wireless communication interface 1130 and to/from other network nodes over network/internetwork interface 1120 as necessary for other operations such as basic wireless function, network management, etc. Signaling/Control data 1115 includes, for example, end-node related data regarding wireless channel assignment for basic operation, and other network-related data such as the address of support/management servers, configuration information for basic network communications. Signaling/Control module 1114 may access and/or modify Signaling/Control data 1115.

Memory 1110 may additionally include a unique identification (ID) assigner module 1140, an ON identification (ID) assigner module 1142, a power controller module 1144, and/or a wireless terminal (WT) verifier module 1146. It is to be appreciated that unique ID assigner module 1140, ON ID assigner module 1142, power controller module 1144, and/or WT verifier module 1146 may store and/or retrieve associated data retained in memory 1110. Further, unique ID assigner module 1140 may allocate a terminal identifier (e.g., scrambling mask) to a wireless terminal and may be similar to the unique identification assigner described above. ON ID assigner module 1142 may assign an ON identifier to a wireless terminal while the wireless terminal is in session ON state. Also, ON ID assigner module 1142 may be similar to session ON identification assigner described above. Power controller module 1144 may be similar to the power controller described above and may transmit power control information to a wireless terminal. WT verifier module 1146 may be similar to the wireless terminal verifier described above and may enable including wireless terminal related information in a transmission unit.

Figure 12:
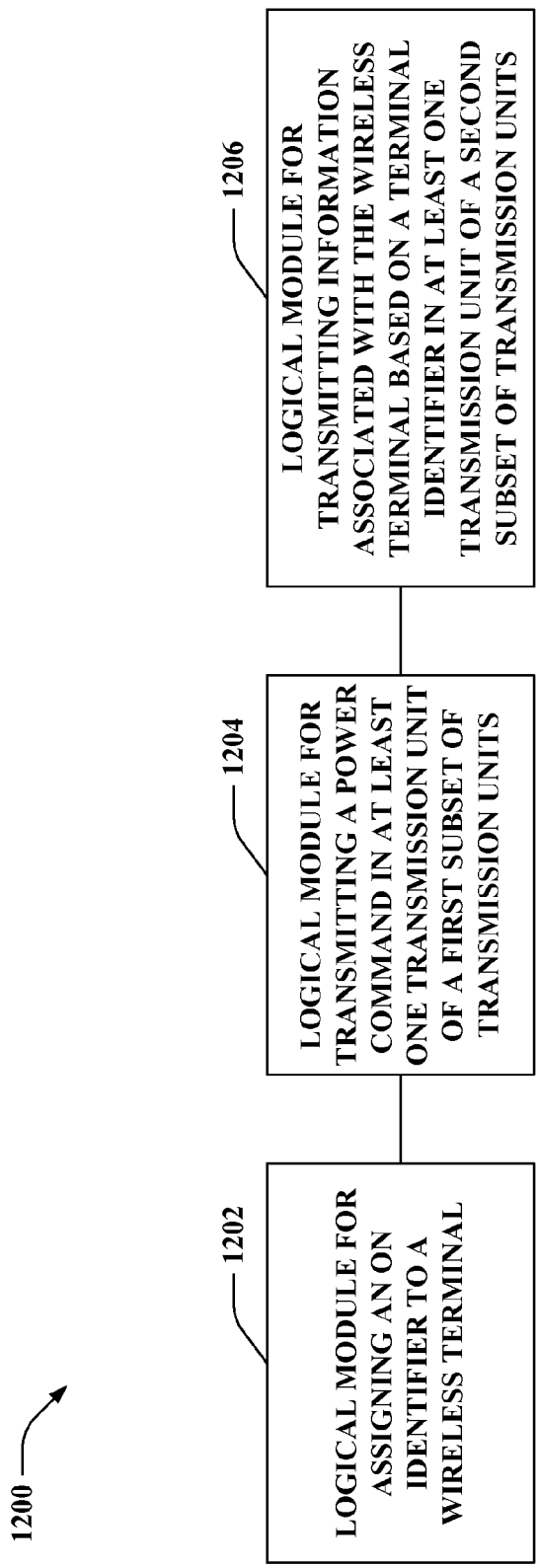
FIG. 12 is an illustration of a system that verifies an identity and controls transmission power of a wireless terminal.

With reference to FIG. 12, illustrated is a system 1200 that verifies an identity and controls transmission power of a wireless terminal. It is to be appreciated that system 1200 is represented as including functional blocks, which can be functional blocks that represent functions implemented by a processor, software, or combination thereof (e.g., firmware). System 1200 can be implemented in a base station and can include a logical module for assigning an ON identifier to a wireless terminal 1202. For example, the ON identifier may be a session ON ID as described above. Further, the ON identifier may be associated with a first predetermined subset of transmission units and a second predetermined subset of the transmission units. Further, system 1200 may comprise a logical module for transmitting a power command in at least one transmission unit of the first subset of transmission units 1204. Pursuant to an illustration, the power command may be transmitted in a first component (e.g., in-phase (I) component, quadrature (Q) component) associated with the transmission unit. Moreover, system 1200 may include a logical module for transmitting information associated with the wireless terminal based on a terminal identifier in at least one transmission unit of a second subset of transmission units 1206. According to an illustration, the wireless terminal related information may be included in a second component (e.g., Q component, I component) associated with the transmission unit. Thus, for instance, the power command and the wireless terminal related information may be transmitted in a common transmission unit by employing disparate components (e.g., I component, Q component) for transmitting each type of data. Moreover, the terminal identifier may be a scrambling mask.

Figure 13:
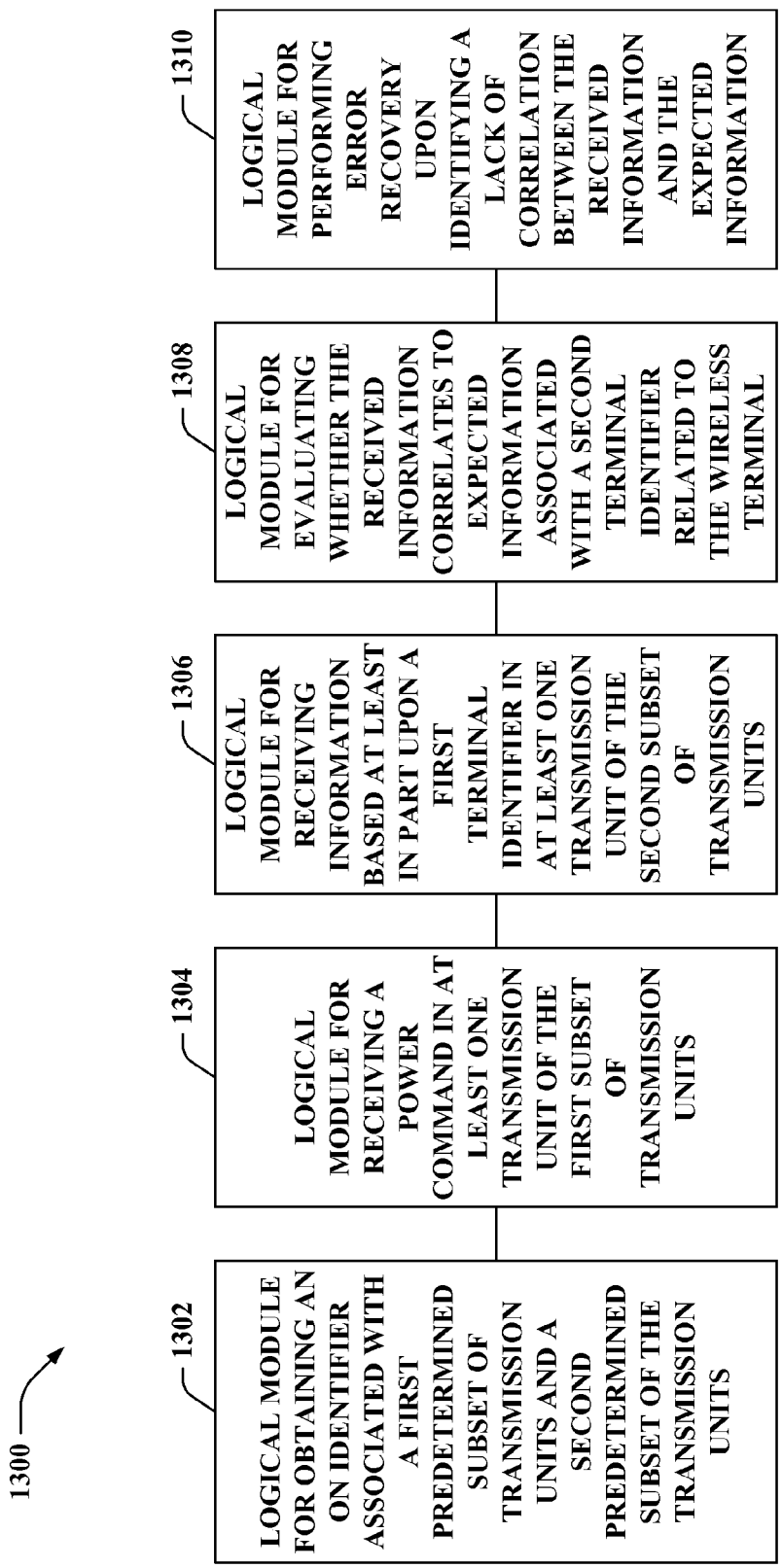
FIG. 13 is an illustration of a system that facilitates controlling transmission power of a wireless terminal.

Now referring to FIG. 13, illustrated is a system 1300 that facilitates controlling transmission power of a wireless terminal. System 1300 is represented as including functional blocks, which may represent functions implemented by a processor, software, or combination thereof (e.g., firmware). System 1300 may be implemented in a wireless terminal and may include a logical module for obtaining an ON identifier associated with a first predetermined subset of transmission units and a second predetermined subset of the transmission units 1302. For instance, the ON identifier may be a session ON ID, an active ID, and the like. Further, the obtained ON identifier may map to the first subset of transmission units and/or the second subset of transmission units. System 1300 may also include a logical module for receiving a power command in at least one transmission unit of the first subset of transmission units 1304. By way of illustration, the power command may be obtained from a first component (e.g., I component, Q component) associated with the transmission unit. Additionally, system 1300 may include a logical module for receiving information based at least in part upon a first terminal identifier in at least one transmission unit of the second subset of transmission units 1306. For instance, the first terminal identifier may be a first scrambling mask utilized by a base station and the received information may be one or more bits from the first scrambling mask. The received information may be included in a second component (e.g., Q component, I component) of a transmission unit. Thus, the power command and the information may be included in disparate components (e.g., power command included in the I component and information included in the Q component, or vice versa) associated with a common transmission unit, for example. System 1300 may further comprise a logical module for evaluating whether the received information correlates to expected information associated with a second terminal identifier related to the wireless terminal 1308. Pursuant to an example, the second terminal identifier may be a second scrambling mask that uniquely identifies the wireless terminal. Moreover, system 1300 may include a logical module for performing error recovery upon identifying a lack of correlation between the received information and the expected information 1310. For instance, the error recovery may include disconnecting from a base station and/or transitioning from session ON to session HOLD.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method that facilitates evaluating wireless terminal specific power control information, comprising:
   receiving an ON identifier allocating a first predetermined subset of transmission units and a second predetermined subset of transmission units;
   receiving a power command in at least one transmission unit of the first subset of transmission units;
   receiving information based at least in part upon a terminal identifier associated with a wireless terminal in at least one transmission unit of the second subset of transmission units;
   comparing the received information associated with the wireless terminal to expected information associated with the wireless terminal; and
   adjusting a power level based upon the power command when the received information matches the expected information.

2. The method of claim 1, wherein the transmission unit is a tone in an Orthogonal Frequency Division Multiplexing (OFDM) symbol period.

3. The method of claim 1, wherein the second subset is a predetermined subset of the first subset.

4. The method of claim 1, further comprising:
   receiving the power command in one of an in-phase component and a quadrature component of a particular transmission unit included in the second subset of transmission units; and
   receiving the information in the other one of the in-phase component and the quadrature component of the same particular transmission unit.

5. The method of claim 1, further comprising:
   receiving the power command in one of an in-phase component and a quadrature component of a particular transmission unit at one energy level when the transmission unit belongs to the first subset of transmission units and does not belong to the second subset of transmission units; and
   receiving less than 20% of the energy level in the other one of the in-phase component and the quadrature component of the same particular transmission unit.

6. The method of claim 1, wherein the terminal identifier is a scrambling mask.

7. The method of claim 6, wherein the information comprises at least one bit of the scrambling mask, a bit position of the one bit within the scrambling mask being a function of a transmission unit.

8. The method of claim 1, wherein the transmission units in the first subset are at least twice as many as the transmission units in the second subset.

9. The method of claim 1, wherein the transmission units in the first subset are eight times as many as the transmission units in the second subset.

10. The method of claim 1, further comprising performing error recovery when the received information fails to match expected information.

11. The method of claim 10, wherein error recovery comprises at least one of disconnecting from a base station and transitioning from session ON to session HOLD.

12. A wireless communications apparatus, comprising:
    a memory that retains an expected terminal identifier that corresponds to a wireless terminal and an ON identifier associated with a first predetermined subset of transmission units and a second predetermined subset of transmission units; and
    a processor that receives a power command in at least one transmission unit of the first subset of transmission units, receives information based upon a terminal identifier in at least one transmission unit of the second subset of transmission units, compares the received information to expected information associated with the expected terminal identifier, and adjusts a power level based upon the comparison.

13. The wireless communications apparatus of claim 12, the processor further performs error recovery when the received information fails to match the expected information associated.

14. The wireless communications apparatus of claim 13, wherein error recovery comprises at least one of disconnecting from a base station and transitioning from session ON to session HOLD.

15. The wireless communications apparatus of claim 12, the processor further receives the power command in one of an in-phase component and a quadrature component of a particular transmission unit included in the second subset of transmission units and receives the information in the other one of the in-phase component and the quadrature component of the same particular transmission unit.

16. The wireless communications apparatus of claim 12, wherein the transmission units in the first subset are eight times as many as the transmission units in the second subset.

17. A wireless communications apparatus for controlling transmission power of a wireless terminal, comprising:
    means for obtaining an ON identifier associated with a first predetermined subset of transmission units and a second predetermined subset of the transmission units;

means for receiving a power command in at least one transmission unit of the first subset of transmission units;

means for receiving information based at least in part upon a first terminal identifier in at least one transmission unit of the second subset of transmission units;

means for evaluating whether the received information correlates to expected information associated with a second terminal identifier related to the wireless terminal; and means for performing error recovery upon identifying a lack of correlation between the received information and the expected information.

18. The wireless communications apparatus of claim 17, wherein the transmission unit is a tone in an Orthogonal Frequency Division Multiplexing (OFDM) symbol period.

19. The wireless communications apparatus of claim 17, further comprising:

means for receiving the power command in one of an in-phase component and a quadrature component of a particular transmission unit included in the second subset of transmission units; and means for receiving the information in the other one of the in-phase component and the quadrature component of the same particular transmission unit.

20. The wireless communications apparatus of claim 17, further comprising means for adjusting a power level based upon the power command when the received information matches the expected information.

21. A non-transitory machine-readable medium having stored thereon machine-executable instructions, comprising:

a first instruction set for obtaining an ON identifier related to a first subset of transmission units and a second subset of transmission units;

a second instruction set for receiving a power command fielding at least one transmission unit of the first subset of transmission units;

a third instruction set for receiving information associated with a first terminal identifier in at least one transmission unit of the second subset of transmission units;

a fourth instruction set for determining whether the received information associated with the first terminal identifier matches expected information associated with a second terminal identifier; and a fifth instruction set for performing error recovery when the received information fails to match the expected information.

22. The non-transitory machine-readable medium of claim 21, further comprising:

a sixth instruction set for receiving the power command in one of an in-phase component and a quadrature component of a particular transmission unit included in the second subset of transmission units; and a seventh instruction set for receiving the information in the other one of the in-phase component and the quadrature component of the same particular transmission unit.

23. The non-transitory machine-readable medium of claim 21, the machine-executable instructions further comprise instructions for modifying a power level based upon the power command when the received information matches the expected information.

24. The non-transitory machine-readable medium of claim 21, wherein the first terminal identifier is a first scrambling mask, the second terminal identifier is a second scrambling mask, the received information comprises at least one bit of the first scrambling mask, and the expected information comprises at least one bit of the second scrambling mask.

25. A processor that executes the following instructions:

obtaining an ON identifier associated with a first predetermined subset of transmission units and a second predetermined subset of transmission units;

receiving a power command in at least one transmission unit of the first subset of transmission units;

receiving information based at least in part upon a first terminal identifier in at least one transmission unit of the second subset of transmission units;

comparing the received information associated with the first terminal identifier with expected information associated with a second terminal identifier assigned to a wireless terminal; and adjusting a power level based on the power command while the received information corresponds to the expected information.

26. The processor of claim 25, wherein the transmission units in the first subset are eight times as many as the transmission units in the second subset.

27. The processor of claim 25, further comprising instructions for performing error recovery when the received information fails to correlate to the expected information.

28. The processor of claim 27, wherein error recovery includes at least one of disconnecting from a base station and transitioning from session ON to session HOLD.

* * * * *